(12) United States Patent
Hamamoto

(10) Patent No.: US 10,450,030 B2
(45) Date of Patent: Oct. 22, 2019

(54) ROTATIONAL APPARATUS AND BICYCLE PROVIDED WITH SAME

(71) Applicants: Yoichiro Hamamoto, Miyazaki (JP); Olympic Group Corporation, Tokyo (JP)

(72) Inventor: Yoichiro Hamamoto, Miyazaki (JP)

(73) Assignees: Yoichiro Hamamoto, Miyazaki (JP); Olympic Group Corporation, Tokyo (JP)

( * ) Notice: Subject to any disclaimer, the term of this patent is extended or adjusted under 35 U.S.C. 154(b) by 176 days.

(21) Appl. No.: 15/550,602

(22) PCT Filed: Feb. 12, 2016

(86) PCT No.: PCT/JP2016/054184
§ 371 (c)(1),
(2) Date: Aug. 11, 2017

(87) PCT Pub. No.: WO2016/129689
PCT Pub. Date: Aug. 18, 2016

(65) Prior Publication Data
US 2018/0037296 A1    Feb. 8, 2018

(30) Foreign Application Priority Data
Feb. 14, 2015  (JP) ................. 2015-027039

(51) Int. Cl.
*B62M 1/00* (2010.01)
*B62M 1/10* (2010.01)
(Continued)

(52) U.S. Cl.
CPC ............... *B62M 1/10* (2013.01); *B62M 3/00* (2013.01); *B62M 3/003* (2013.01); *B62M 6/55* (2013.01);
(Continued)

(58) Field of Classification Search
CPC ................. B62M 1/10; B62M 1/105
See application file for complete search history.

(56) References Cited

U.S. PATENT DOCUMENTS 3,828,621 A * 8/1974 Uchino ................. B62M 1/105
474/156
5,035,678 A * 7/1991 Hageman ................. B62M 1/10
280/215
(Continued)

FOREIGN PATENT DOCUMENTS

CN       101821157 A   9/2010
EP       2213566 A1    8/2010
(Continued)

OTHER PUBLICATIONS

International Search Report, International Application No. PCT/JP2016/054184, pp. 1-4, International Filing Date Feb. 12, 2016, dated May 10, 2016.
(Continued)

*Primary Examiner* — Tony H Winner
(74) *Attorney, Agent, or Firm* — JCIPRNET

(57) ABSTRACT

Disclosed is a rotation transmission mechanism including: an internal rotation member inserted by a crankshaft of a bicycle; and an external rotation member configured on the internal rotation member. The internal rotation member includes: an internal rotation member body. The external rotation member includes: a circular ring part configured at an outer side of the outer circumferential convex parts; and inner circumferential convex parts protruding to an inner circumferential side of the circular ring part and configured alternately with the outer circumferential convex parts. Elastic deformation parts are configured between the outer circumferential convex parts and the inner circumferential convex parts on a rotation direction side of the advancing outer circumferential convex parts. The outer circumferen-
(Continued)

tial convex parts are formed in such a manner that a surface on the rotation direction side is greater than a surface on an opposite side of the rotation direction.

14 Claims, 24 Drawing Sheets

(51) Int. Cl.
  *B62M 3/00* (2006.01)
  *F16D 3/12* (2006.01)
  *B62M 9/02* (2006.01)
  *B62M 6/55* (2010.01)
  *B62M 9/10* (2006.01)
  *B62M 21/00* (2006.01)
  *F16F 15/124* (2006.01)

(52) U.S. Cl.
  CPC .............. *B62M 9/02* (2013.01); *B62M 9/105* (2013.01); *B62M 21/00* (2013.01); *F16D 3/12* (2013.01); *F16F 15/1245* (2013.01); *B62M 1/105* (2013.01)

(56) References Cited

U.S. PATENT DOCUMENTS

| | | | |
|---|---|---|---|
| 5,279,524 A * | 1/1994 | Hilber | B62M 1/105 474/69 |
| 2010/0009763 A1 | 1/2010 | Martinek et al. | |
| 2010/0148465 A1 * | 6/2010 | Coghill, Jr. | B62M 1/105 280/214 |

FOREIGN PATENT DOCUMENTS

| | | |
|---|---|---|
| GB | 325198 | 2/1930 |
| JP | 2014198505 A | 10/2014 |
| JP | 2014231281 A | 12/2014 |
| JP | 2015009602 A | 1/2015 |
| TW | 200918383 A | 5/2009 |
| WO | 02086342 | 10/2002 |
| WO | 2009054161 A1 | 4/2010 |

OTHER PUBLICATIONS

"Search Report of Europe Counterpart Application", dated Mar. 18, 2019, p. 1-p. 15.

* cited by examiner

Surface

Back

ROTATIONAL APPARATUS AND BICYCLE PROVIDED WITH SAME

TECHNICAL FIELD

The present disclosure relates to a rotational apparatus, and particularly relates to a rotational apparatus assembled and connected to a rotating shaft such as a crankshaft and the like of a bicycle for use.

BACKGROUND

A bicycle can run through a smaller force once running out under a condition that wheels are rotated by a human force, but will be applied by an extra-large repulsive force while beginning to pedal for starting, accelerating, climbing and the like, and part of input energy as impact recoils to knees, ankle joints, waist and the like, so a heavy load is generated on a human body and the input energy cannot be efficiently utilized, thereby reducing a propulsion force. Then, particularly in case of fast start, fast acceleration, climbing, heavy body weight of a bicyclist or heavy weight of loaded cargoes and the like, the load (resistance) of the human body is increased, and correspondingly the needed energy is increased.

An up-and-down motion of feet is converted into a rotation motion through a crank in the case of the bicycle, so a burden to the knees and the ankle joint is increased because a foot force is difficult to be smoothly transmitted at a top dead center and a bottom dead center particularly, and interruption of a torque and reduction of velocity may be caused. Problems that stall is easily caused and running stability is reduced exist in case of low-speed running.

Therefore, in the past, various structures were researched with respect to a purpose of alleviating fatigue of the bicyclist by absorbing impact during running, attempting to increase rotation efficiency and stabilizing the propulsion force and acceleration.

For example, in a patent literature 1, the following content is disclosed: "a bicycle includes an automatic telescopic change type crank mechanism, and has a small pedal rotating radius in a cruise running mode, and when the bicycle enters a running mode in which a heavier burden is applied, the pedal rotating radius is automatically elongated according to the resistance to obtain a great rotation torque".

In a patent literature 2, the following content is disclosed: "a shock absorber for a bicycle includes a first member, a second member and a first elastic member, wherein the first member can be fixed to a first frame member and includes a containing space formed inside and at least one first protrusion part protruding from an inner circumferential surface of the containing space to the inner side; the second member can be fixed to a second frame member, configured in the containing space of the first member in a relatively rotation manner and includes a second protrusion part protruding from an outer circumferential surface to the outer side; and the first elastic member is assembled and connected to one of two spaces partitioned by the two protrusion parts between the first member and the second member, retained on the first protrusion part and the second protrusion part and separated from at least one of the inner circumferential surface and the outer circumferential surface at an interval, and extended and retracted by virtue of relative rotation of the two members".

In a patent literature 3, the following content is disclosed: "a driving gear for a bicycle includes a gear body and a supporting body, wherein the gear body includes a plurality of teeth at the periphery; the supporting body supports the gear body; a power transmitting part for transmitting power from one of the gear body and the supporting body to the other is arranged between the gear body and the supporting body; a gap through which the gear body and the supporting body can relatively rotate by a specified angle is formed at the power transmitting part; and elastic bodies are arranged at different parts of the power transmitting part. The gap is remained due to the elastic bodies, and elastic deformation is generated to absorb the gap when the gear body and the supporting body relatively rotate, so that power transmission from the power transmitting part is possible."

In a patent literature 4, the following content is disclosed: "a power transmitting apparatus for a bicycle has a composition that: a spiral spring wound and assembled towards an opposite direction of a rotation direction of a front gear is arranged in an inner circumferential wall of the front gear, and due to an effect of the spiral spring, a torque generated by an excessive pedaling pressure of a pedal arm is accumulated on the spiral spring, and the accumulated torque is supplemented when pedal input is insufficient, thereby improving rotation efficiency of the pedal."

In a patent literature 5, the following content is disclosed: "a crank apparatus for a bicycle is characterized in that metal parts of a plurality of spring supporting sheets are radially embedded into a gear shaft of the bicycle in a protruding manner, annular bodies of which inner circumferential surfaces are supported and are rotated concentrically with the gear shaft are embedded into outer circumferential edges of the spring supporting sheets to serve as a base part of the crank, spring pressing sheets are arranged on the inner circumferential surfaces of the annular bodies in a manner of corresponding to the spring supporting sheets in a protruding manner, and spring bodies are inserted between the spring supporting sheets and the spring pressing sheets. Thus, when the crank is stressed to rotate, the annular bodies at the base part are rotated together earlier than the gear shaft, the spring bodies are compressed by the protruded spring pressing sheets, and the spring supporting sheets are pressed by a reaction force to enable the gear shaft to rotate".

However, an existing art above has the following problems:

(1) For the bicycle in the patent literature 1, the pedal rotating radius is automatically elongated according to the resistance, so the following problems exist: a structure of the crank mechanism becomes complicated, the quantity of parts is increased, and action stability, assembly operability and mass production are poor.

In addition, the following problems exist: the pedal rotating radius is increased at a large resistance, so high output can be obtained through low input, and the load during start of pedaling and the like can be reduced; however, a track of the pedal cannot form a circular track, and a reluctant pedaling manner is needed; and therefore, a great burden is generated to the knees, ankle joint and the like.

(2) For the shock absorber for the bicycle in the patent literature 2, when impact acts on the first frame member or the second frame member from a pavement, the first member and the second member are rotated, the first elastic member assembled and connected in one of the spaces partitioned by the two protrusion parts is clamped by the two protrusion parts to compress and deform, and an elastic restoration force is generated to absorb the impact. However, a suspension assembly body is fixed to a main frame member through an outside member, so impact energy at an initial motion of the crank is absorbed and accumulated, the accumulated energy cannot be converted into a rotating force to serve as the propulsion force to be effectively utilized when the elastic body is restored, and improvement of the rotation efficiency and acceleration, homogenization of the rotation torque and the like are not considered.

(3) A purpose of the driving gear for the bicycle in the patent literature 3 is to relieve impact generated by a driving force when pedaling starts, and the driving gear has a structure that the elastic body is arranged between the gear body and the supporting body at a part different from the power transmitting part and generates deformation in a torsion manner, so the following problems exist: the elastic body is difficult to deform and difficult to accumulate energy, so the restoration of the elastic body is difficult to be effectively converted into the rotating force, and effective utilization of the energy is poor.

In addition, the number of the parts is large, the structure is complicated, the mass production is poor. Moreover, the gear body and the supporting body are integrated by the elastic body, so the following problems exist: the gear body and the elastic body are difficult to be replaced, and maintainability is poor.

(4) A purpose of the power transmitting apparatus for the bicycle in the patent literature 4 is to accumulate the torque generated by the excessive pedaling pressure of the pedal. The accumulated torque is supplemented when the pedal input is insufficient, so that the input of pedaling pressure is stabilized to strive to improve the rotation efficiency of the pedal, and the propulsion and acceleration are stabilized to alleviate the fatigue. However, accumulation and supplement of the torque are performed by a clockwork (plate spring)-shaped spring, a coiled spring and other spiral springs, so the following problems exist: time is spent before the spiral spring is completely wound to accumulate the torque, and during the period, the pedal shaft idles relative to the front gear, the power cannot be transmitted, and usability is obviously poor.

In addition, the following problems exist: the power cannot be transmitted from the pedal shaft to the front gear under a condition that the spiral spring is damaged, and the bicycle cannot run, so power transmission reliability and stability are poor.

(5) For the crank apparatus for the bicycle in the patent literature 5, the inner circumferential surfaces of the annular bodies serving as the base part of the crank are supported on the outer circumferential edges of the spring supporting sheets, the following problems exist: the crank and the gear shaft are easy to rotate together due to a friction force between the inner circumferential surfaces of the annular bodies and the outer circumferential edges of the spring supporting sheets, the annular bodies are difficult to rotate earlier than the gear shaft, the spring body cannot be reliably compressed, the action stability is poor, force accumulation (absorption of the impact energy) at the top dead center and restoration at the bottom dead center cannot be fully performed, and effects of improving the rotation efficiency and acceleration and homogenizing the rotation torque are insufficient.

In addition, the crank apparatus must be assembled at two ends of the gear shaft, so the following problems exist: the quantity of the parts is increased, the whole apparatus is complicated, large and poor in space conservation and mass production, and since torsion of the gear shaft is generated due to phases of the cranks at the two ends; accumulation of the input energy and conversion from the accumulated energy to the rotating force cannot be efficiently performed, and durability, action stability and efficiency are poor.

Therefore, in order to solve the existing problems above, the inventor provides a bicycle as follows: a rotational apparatus for a bicycle is assembled on a rotating shaft of the bicycle of which wheels rotate and run through a human force. Thus, the impact energy or extra-large input energy generated by a heavy load and the like applied from outside can be reliably absorbed and accumulated in initial motions such as starting, accelerating, climbing and the like or during running, thereby greatly reducing the human load. Moreover, the accumulated energy is effectively utilized in rotation of the rotating shaft losslessly when the input energy is reduced or interrupted; rotation transmitting reliability and efficiency are excellent; lightweight, easiness in disassembly and assembly and excellent maintainability and productivity can be achieved by virtue of a simple structure with fewer parts; the rotational apparatus can be simply and conveniently assembled into an existing bicycle; and the mass production, assembly operability, space conservation and universality are excellent. The bicycle includes the rotational apparatus for the bicycle, so that a load applied to the waist, legs and the like of a user can be reduced, the acceleration, uniformity of the rotation torque and stability during low-speed running are excellent when heavy cargoes are transported or a person with heavy body weight is carried, a load applied to the knees, the ankle joint and the like of a bicyclist can be reduced without any complicated operation, and the bicycle can be easily ridden by women, the old, housewives carrying heavy cargoes or children, can serve as a daily necessity which can easily run on ramp or a road with a large resistance, is excellent in the acceleration, uniformity of the rotation torque and stability during low-speed running, can also be used for rehabilitation training or athletic competition and has excellent action stability, operability and universality. Moreover, the inventor proposes a bicycle with the following structure based on a purpose of providing the bicycle above (a patent literature 6).

Namely, in the patent literature 6, the following content is disclosed: "a bicycle includes: a rotational apparatus for a bicycle, a left and a right crank arms and a pedal, wherein the rotational apparatus includes an internal rotation member and an external rotation member; the internal rotation member includes a rotating shaft; the external rotation member is configured on the rotating shaft of the internal rotation member in a rotation manner; the left and the right crank arms are assembled at two ends of the internal rotation member of the rotational apparatus for the bicycle at a phase difference of 180°; and the pedal is configured at the end parts of the crank arms in a rotation manner. In the bicycle:

The internal rotation member includes more than one outer circumferential protrusion part integrally formed with the rotating shaft or fixedly arranged at the outer circumference of the rotating shaft and protruding towards the outer circumferential side of the rotating shaft.

The external rotation member includes a side plate part, inserted into the rotating shaft in a rotation manner at a side part of the outer circumferential protrusion part of the internal rotation member; an outer cylinder part, uprightly arranged at the outer circumference of the side plate part concentrically with the rotating shaft on an outer side of the outer circumferential protrusion part of the internal rotation member; and more than one inner circumferential protrusion part, integrally formed with the side plate part and/or the outer cylinder part or fixed to the side plate part and/or the outer cylinder part in a manner of protruding to an inner circumference side of the outer cylinder part and configured alternately with the outer circumferential protrusion part of the internal rotation member.

A chain ring is arranged in a proper shape or fixedly arranged on the side plate part or the outer cylinder part of the external rotation member.

An elastic part is assembled between the outer circumferential protrusion part and the inner circumferential protrusion part on a rotation direction side of the advancing outer circumferential protrusion part, and when the internal rotation member and the external rotation member are rotated, the elastic part is clamped between the outer circumferential protrusion part and the inner circumferential protrusion part and generates elastic deformation.

CURRENT TECHNICAL LITERATURE

Patent Literature

Patent Literature 1: Japanese Laid-Open Patent Publication No. 2003-312581
Patent Literature 2: Japanese Laid-Open Patent Publication No. 11-278350
Patent Literature 3: Japanese Laid-Open Patent Publication No. 64-63489
Patent Literature 4: Japanese Laid-Open Patent Publication No. 9-076980
Patent Literature 5: Japanese Laid-Open Patent Publication No. 58-036789
Patent Literature 6: Japanese Laid-Open Patent Publication No. 4456179

SUMMARY

Problems to be Solved in the Disclosure

The bicycle in the patent literature 6 achieves the above purpose, but the inventor is continuously determined to study to complete the present disclosure in order to ensure better usability of the bicycle in the patent literature 6.

The purpose of the present disclosure is to provide a rotational apparatus capable of realizing a bicycle and the like with better usability than an existing art, and a bicycle provided with same.

Solution for Solving the Problems

To achieve the purpose, a first composition of the rotational apparatus of the present disclosure is as follows:

(1) the rotational apparatus includes: an internal rotation member inserted by a rotating shaft; and an external rotation member configured on the internal rotation member in a rotation manner, wherein the internal rotation member includes: a disc-shaped internal rotation member body having through hole for inserting the rotating shaft; and one or more outer circumferential convex parts, integrally formed with the internal rotation member body or fixedly arranged on the internal rotation member body, and protruding to an outer circumferential side of the internal rotation member body;

the external rotation member includes: a circular ring part configured on the internal rotation member at an outer side of the outer circumferential convex parts of the internal rotation member in a rotation manner; and one or more inner circumferential convex parts, integrally formed with the circular ring part in a manner of protruding to an inner circumferential side of the circular ring part or fixedly arranged on the circular ring part and configured alternately with the outer circumferential convex parts of the internal rotation member;

elastic parts are configured between the outer circumferential convex parts and the inner circumferential convex parts on a rotation direction side of the advancing outer circumferential convex parts. When the internal rotation member and the external rotation member rotate, the elastic parts are clamped between the outer circumferential convex parts and the inner circumferential convex parts and generate elastic deformation, wherein the outer circumferential convex parts are formed in such a manner that a surface on the rotation direction side is greater than a surface on an opposite side of the rotation direction.

According to the composition (1) of the rotational apparatus of the present disclosure, the elastic parts configured between the outer circumferential convex parts and the inner circumferential convex parts on a rotation direction side of the advancing outer circumferential convex parts generate compressive deformation within a range greater than an existing art to efficiently accumulate compression (elastic) energy in the elastic parts. The compression (elastic) energy is converted into rotation energy and is used as a propulsion force of the bicycle and the like. Therefore, under a condition that the rotational apparatus is used for the bicycle and the like, loads on a human body can be obviously reduced. As a result, the bicycle with better usability than an existing art can be realized.

In the composition (1) of the rotational apparatus of the present disclosure, the following compositions (2)-(4) and (6) may be adopted.

(2) The outer circumferential convex parts are formed in such a manner that the surface on the rotation direction side is inclined more gently than the surface on the opposite side of the rotation direction, and a fillet is formed on a boundary part between the surface on the rotation direction side and the internal rotation member body.

According to the composition (2), a height of the outer circumferential convex parts $3f$ is lowered and miniaturization of the rotational apparatus 1 can be attempted. In addition, a compression distance of the elastic part 6 is increased towards the outer circumferential side. Therefore, more compression energy can be accumulated.

(3) A surface in the inner circumferential convex parts opposite to the surface on the rotation direction side of the outer circumferential convex parts is formed in a sunken state.

According to the composition (3), a number of the elastic parts configured between the outer circumferential convex parts and the inner circumferential convex parts on a rotation direction side of the advancing outer circumferential convex parts can be increased. Therefore, the compression (elastic) energy adequate for use as the propulsion force can be accumulated in the elastic parts.

(4) At least part of the through hole for inserting the rotating shaft is a splined hole.

According to the composition (4), splines fixedly connected to a crankshaft of an electric auxiliary bicycle concentrically are inserted into the splined hole. Thus, the rotational apparatus can be assembled and connected to the crankshaft of the electric auxiliary bicycle. Then, fatigue of a bicyclist can be obviously alleviated in a manner that the rotational apparatus of the present disclosure is assembled and connected to the crankshaft of the electric auxiliary bicycle for use.

A second composition of the rotational apparatus of the present disclosure is as follows:

(1) the rotational apparatus includes: an internal rotation member inserted by a rotating shaft; and an external rotation member configured on the internal rotation member in a rotation manner, wherein the internal rotation member includes: a disc-shaped internal rotation member body having through hole for inserting the rotating shaft; and one or more outer circumferential convex parts, integrally formed with the internal rotation member body or fixedly arranged on the internal rotation member body, and protruding to an outer circumferential side of the internal rotation member body;

the external rotation member includes: a circular ring part configured on the internal rotation member at an outer side of the outer circumferential convex parts of the internal rotation member in a rotation manner; and one or more inner circumferential convex parts, integrally formed with the circular ring part in a manner of protruding to an inner circumferential side of the circular ring part or fixedly arranged on the circular ring part, and configured alternately with the outer circumferential convex parts of the internal rotation member, wherein a polarity-switchable electromagnet is assembled on any one of the outer circumferential convex parts and the inner circumferential convex parts on the rotation direction side of the advancing outer circumferential convex parts; and a permanent magnet or electromagnet is assembled on the other one.

According to the composition (5) of the rotational apparatus of the present disclosure, even if actions such as pedaling and the like are not conducted, a polarity of the electromagnet assembled on any one of the outer circumferential convex parts and the inner circumferential convex parts on the rotation direction side of the advancing outer circumferential convex parts can be switched at a specified opportunity to enable the external rotation member to rotate and to be used as a propulsion force of the bicycle and the like.

A third composition of the rotational apparatus of the present disclosure is as follows:

(6) a relative angle between the internal rotation member and the external rotation member during relative rotation is 4° to 30°.

A composition of a bicycle of the present disclosure is as follows:

(7) the bicycle has any one of compositions (1)-(6) of the rotational apparatus of the present disclosure.

According to the composition (7) of the bicycle of the present disclosure, the rotational apparatus capable of realizing the above effect is provided, and therefore, the bicycle with better usability than the existing art can be provided.

Effects of the Disclosure

According to the present disclosure, a rotational apparatus capable of realizing a bicycle and the like with better usability than the existing art can be provided.

DETAILED DESCRIPTION

The present disclosure is described in more detail below through proper embodiments. However, embodiments below are only specific examples of the present disclosure, and the present disclosure is not limited to this.

[Embodiment I]

(Composition of Rotation Transmission Mechanism)

First, with reference to FIG. 1 to FIG. 6, the composition of the rotational apparatus in embodiment I of the present disclosure is described.

Figure 1:
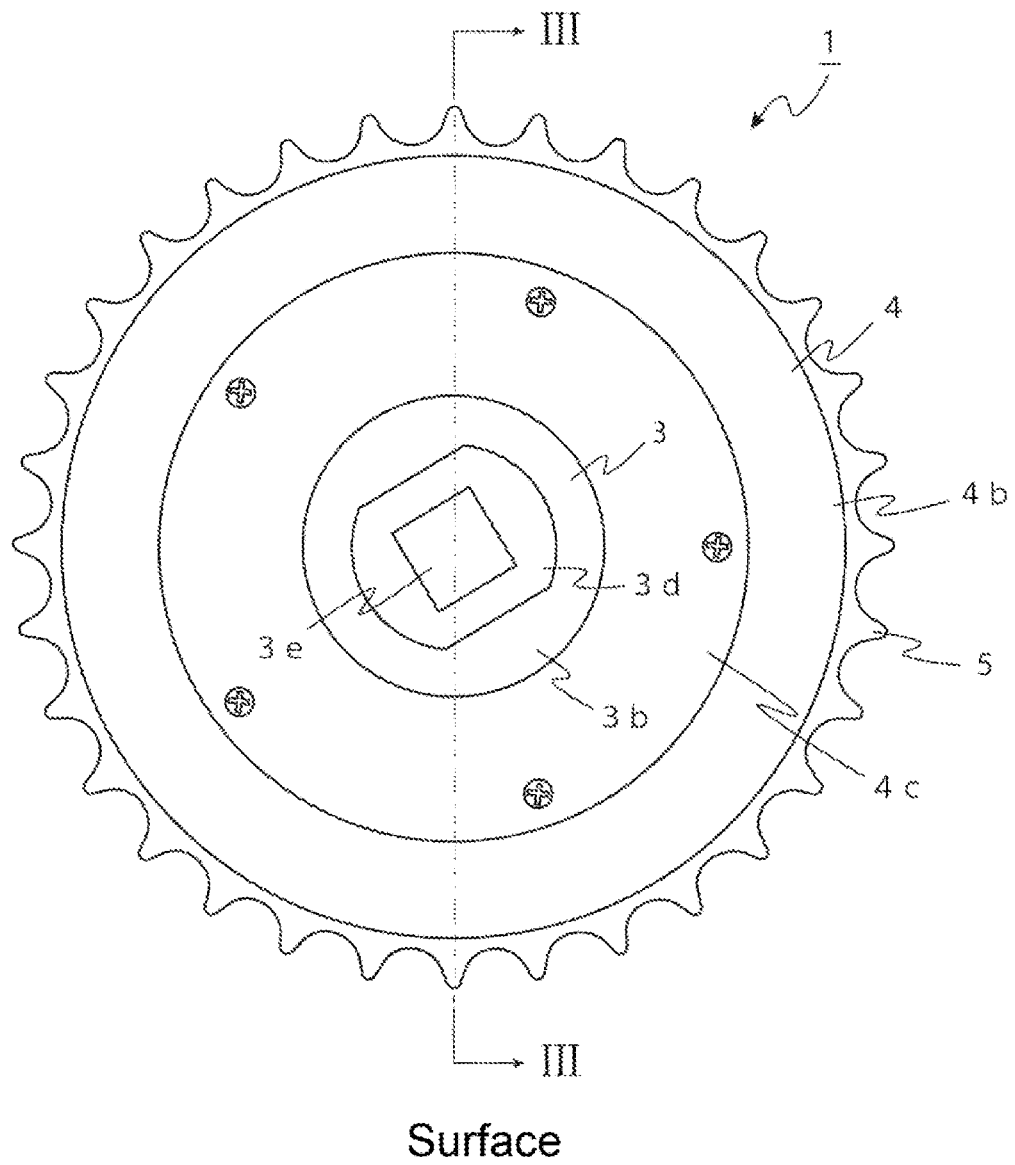
FIG. 1 is a surface diagram illustrating a rotational apparatus in embodiment I of the present disclosure.
Figure 2:
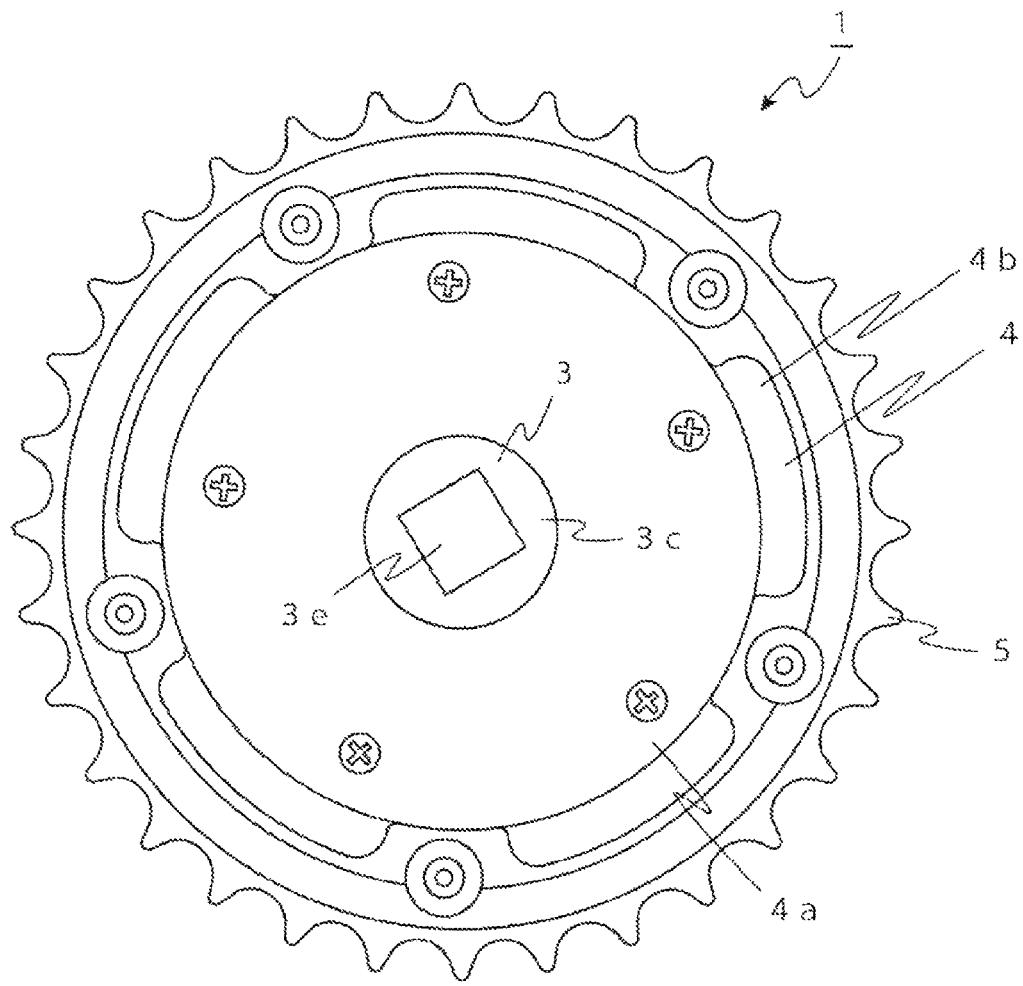
FIG. 2 is a back diagram illustrating a rotational apparatus in embodiment I of the present disclosure.
Figure 3:
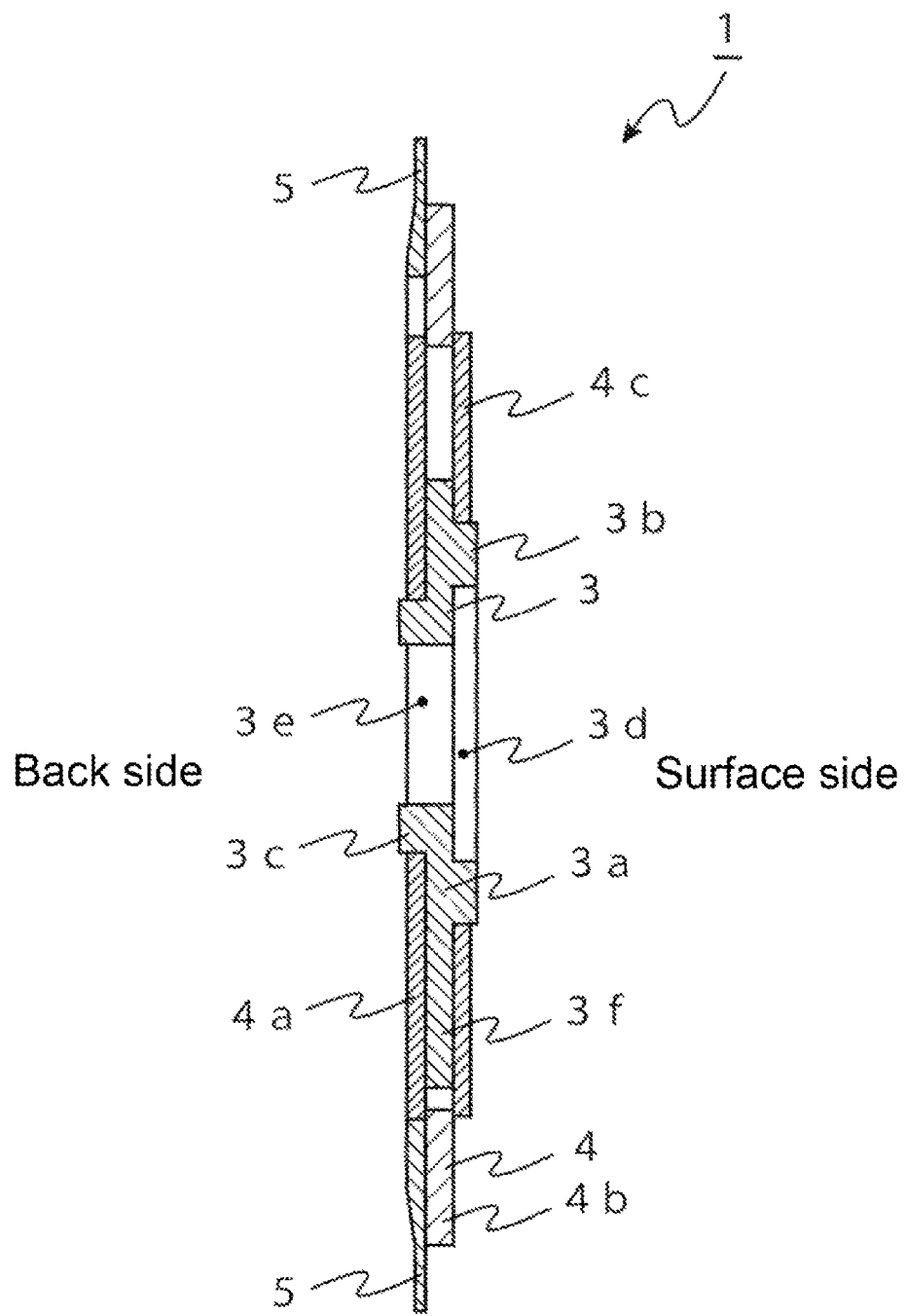
FIG. 3 is a sectional view illustrating line III-III in FIG. 1.
Figure 4:
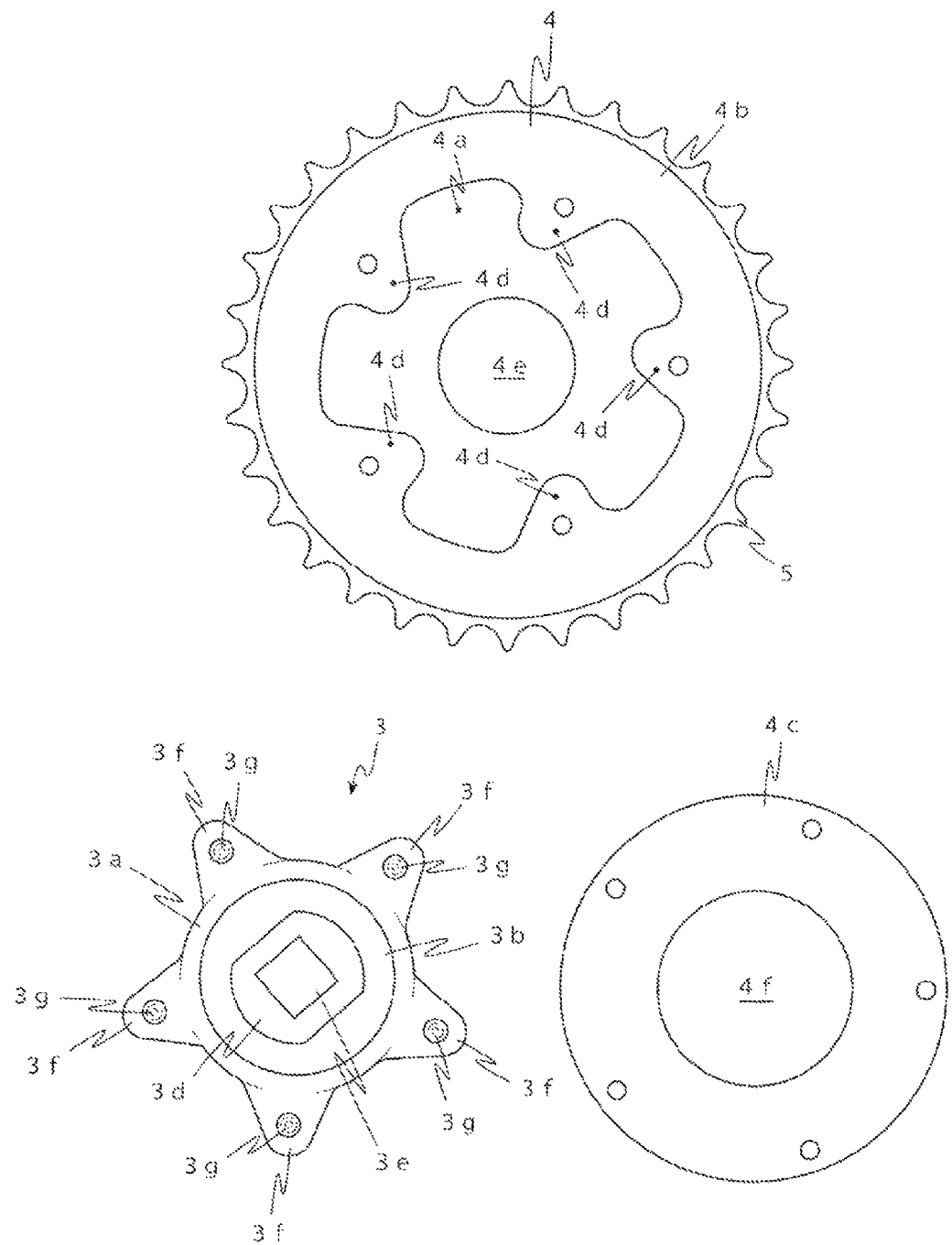
FIG. 4 is an exploded surface diagram illustrating a rotational apparatus in embodiment I of the present disclosure.
Figure 5:
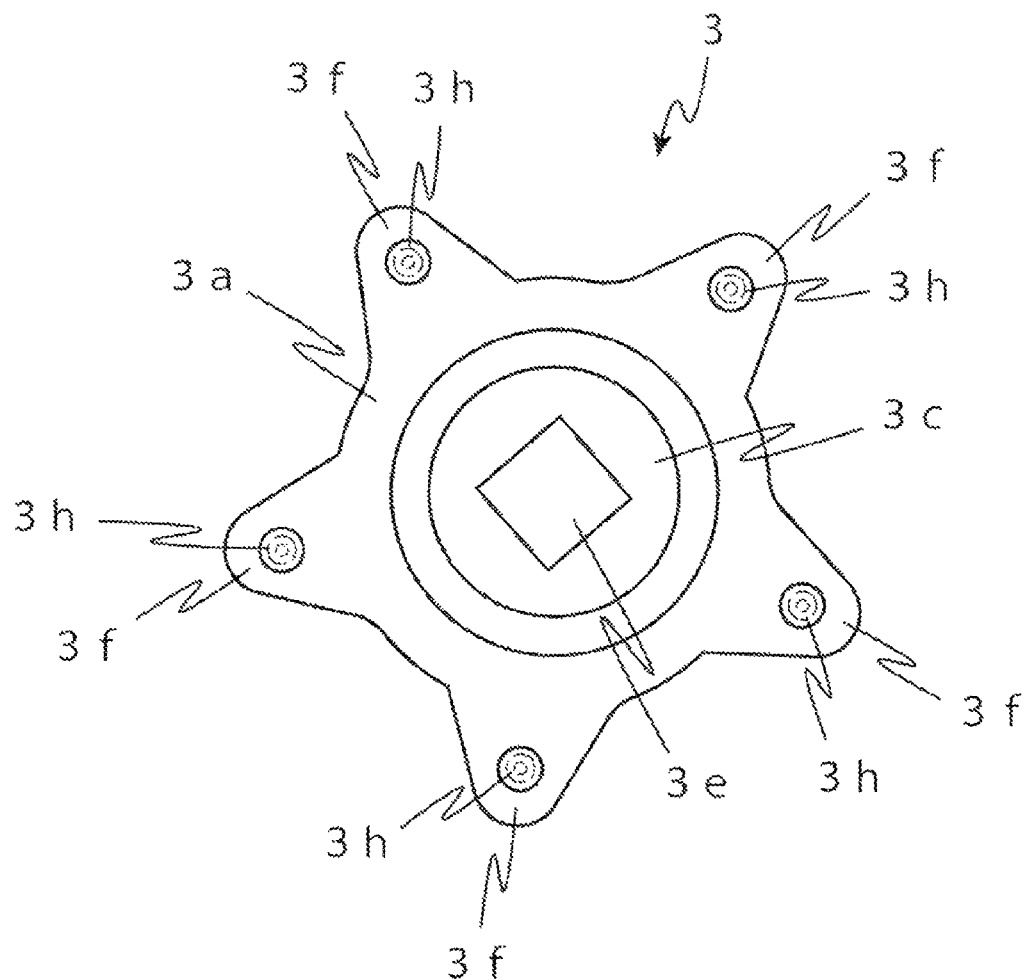
FIG. 5 is a back diagram illustrating an internal rotation member forming a rotational apparatus in embodiment I of the present disclosure.
Figure 6:
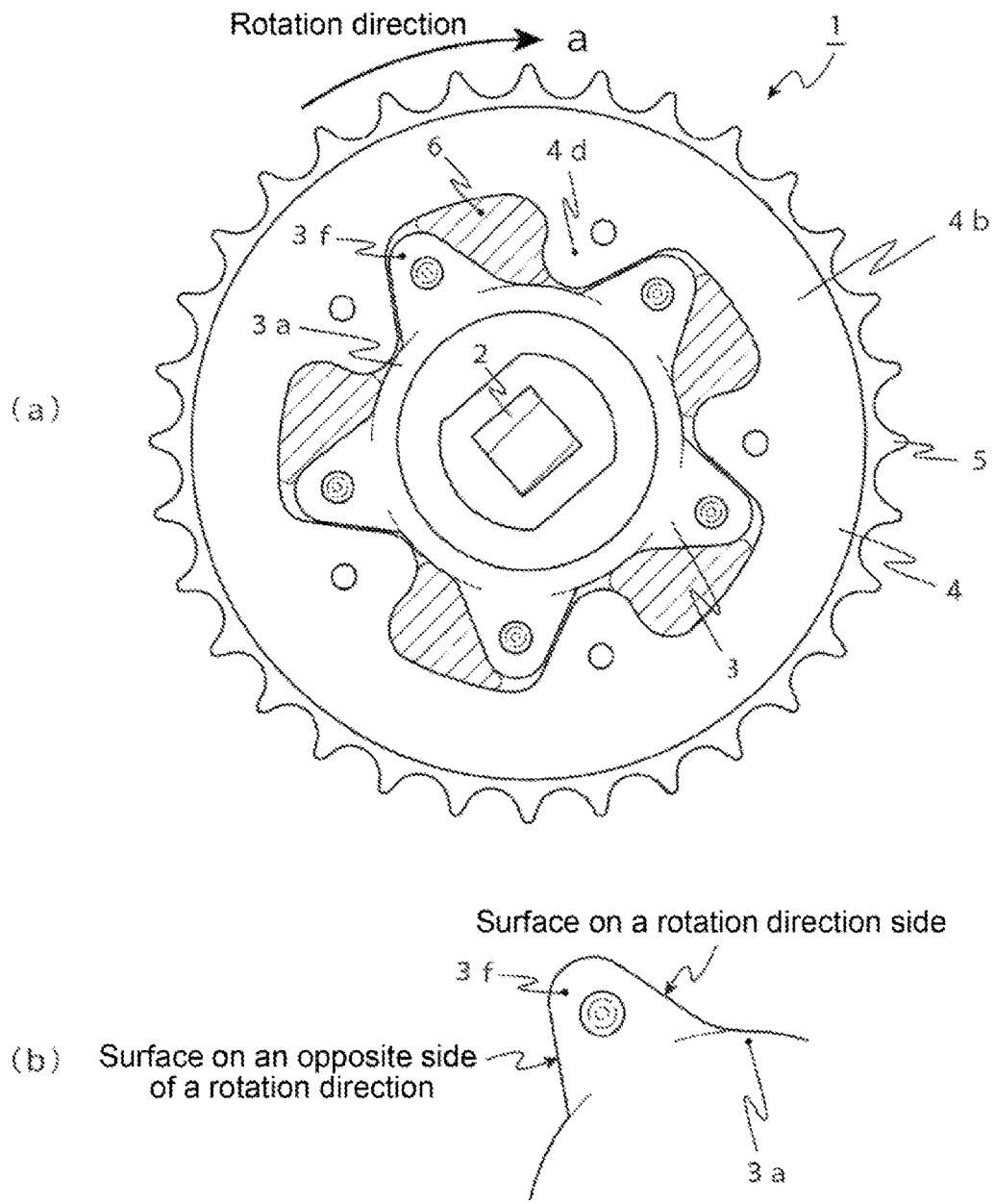
FIG. 6 is a surface diagram illustrating a state after removing a cover part of a rotational apparatus in embodiment I of the present disclosure.

FIG. 1 is a surface diagram illustrating a rotational apparatus in embodiment I of the present disclosure. FIG. 2 is a back diagram illustrating a rotation transmission mechanism. FIG. 3 is a sectional view illustrating III-III line in FIG. 1. FIG. 4 is an exploded surface diagram illustrating a rotation transmission mechanism. FIG. 5 is a back diagram illustrating an internal rotation member forming a rotation transmission mechanism. FIG. 6 is a surface diagram illustrating a state after removing a cover part of a rotation transmission mechanism.

As shown in FIG. 1 to FIG. 6, the rotational apparatus 1 in the present embodiment, for example, includes: an internal rotation member 3 inserted by a rotating shaft such as a crankshaft and the like of a bicycle; and an external rotation member 4 configured on the internal rotation member 3 in a rotation manner.

The internal rotation member 3 includes: a disc-shaped internal rotation member body 3a; low-height cylindrical convex parts 3b and 3c integrally formed on a surface and a back of the internal rotation member body 3a respectively; a press-in concave part 3d, formed on the convex part 3b and having an approximately oval shape in section; and a four-corner cylindrical through hole for inserting crankshaft 3e, penetrating through the convex part 3c and the internal rotation member body 3a up to the press-in concave part 3d.

In addition, the internal rotation member 3 includes five outer circumferential convex parts 3f integrally formed with the internal rotation member body 3a and protruding to an outer circumferential side of the internal rotation member body 3a. Bearing balls 3g and 3h are rotatably kept on the surfaces and the backs of the outer circumferential convex parts 3f respectively. The balls 3g and 3h are located at a position of 45% to 65% relative to a radial protruding height of the outer circumferential convex parts 3f, preferably at a position of 58% to 62%.

The external rotation member 4 includes: a side plate part 4a, located in a side position of the outer circumferential convex parts 3f of the internal rotation member 3 and inserted into the convex part 3c of the internal rotation member 3 in a rotation manner; a circular ring part 4b, fixed to an outer circumference of the side plate part 4a through screws at the outer side of the outer circumferential convex parts 3f of the internal rotation member 3; and a cover part 4c, inserted into the convex part 3b in a rotation manner in a state of being configured oppositely to the side plate part 4a and fixed to the circular ring part 4b through screws. It should be noted that at the internal rotation member 3, the bearing balls 3g and 3h kept at the surfaces and the backs of the outer circumferential convex parts 3f are respectively rolled and simultaneously rotated on the cover part 4c and the side plate part 4a. Thus, the internal rotation member 3 is smoothly rotated.

In addition, the external rotation member 4 includes five inner circumferential convex parts 4d integrally formed with the circular ring part 4b in a manner of protruding to an inner circumferential side of the circular ring part 4b and configured alternately with the outer circumferential convex parts 3f of the internal rotation member 3.

Moreover, a chain ring 5 is fixedly arranged at an outer circumferential part of a back side of the circular ring part 4b of the external rotation member 4.

The rotational apparatus 1 is assembled in an order below. Namely, first, as shown in FIG. 2 and FIG. 3, the side plate part 4a is fixed to the circular ring part 4b through screws from the back side of the circular ring part 4b. Then, as shown in FIG. 3, FIG. 4 and FIG. 6, the convex part 3c on the back side of the internal rotation member 3 is inserted into the inserting through hole 4e of the side plate part 4a from the surface side of the side plate part 4a, so that the internal rotation member 3 is configured in the circular ring part 4b. Next, as shown in FIG. 1, FIG. 3 and FIG. 4, the convex part 3b on the surface side of the internal rotation member 3 is inserted into the inserting through hole 4f of the cover part 4c, and the cover part 4c is fixed to the surface of the circular ring part 4b through screws.

As shown in FIG. 6(a), elastic parts 6 made of synthetic rubber are configured between the outer circumferential convex parts 3f and the inner circumferential convex parts 4d on a rotation direction side of the advancing outer circumferential convex parts 3f. When the internal rotation member 3 and the external rotation member 4 rotate, the elastic parts 6 are clamped between the outer circumferential convex parts 3f and the inner circumferential convex parts 4d and generate elastic deformation (compression deformation). Herein, lateral deformation of the elastic parts 6 is prevented by the side plate part 4a and the cover part 4c. Thus, part of input energy can be efficiently accumulated in the elastic parts 6.

As shown in FIG. 6(b), in the rotational apparatus 1 in the present embodiment, the surface on the rotation direction side of the outer circumferential convex parts 3f is greater than the surface on the opposite side of the rotation direction by about 10% to 15%, for example about 12% to 13%. Therefore, the elastic parts 6 configured between the outer circumferential convex parts 3f and the inner circumferential convex parts 4d on the rotation direction side of the advancing outer circumferential convex parts 3f generate compressive deformation within a range greater than an existing art to efficiently accumulate compression (elasticity) energy in the elastic parts 6. The compression (elastic) energy is converted into rotation energy and is used as a propulsion force of the bicycle and the like.

More specifically, the outer circumferential convex parts 3f are formed in such a manner that the surface on the rotation direction side is inclined more gently than the surface on the opposite side of the rotation direction, and a fillet is formed on a boundary part between the surface on the rotation direction side and the internal rotation member body 3a. By setting such a shape, the surface on the rotation direction side of the outer circumferential convex parts 3f is increased. Thus, a height of the outer circumferential convex parts 3f is lowered and miniaturization of the rotational apparatus 1 can be attempted. In addition, a compression distance of the elastic part 6 is increased towards the outer circumferential side. Therefore, more compression energy can be accumulated.

In addition, a centrifugal force of the rotational apparatus 1 during rotation can be adjusted by adjusting a thickness of the circular ring part 4b. Therefore, a rotating inertial force can be adjusted.

The surface in the inner circumferential convex parts 4d opposite to the surface on the rotation direction side of the outer circumferential convex parts 3f is formed in a sunken state. Therefore, a number of the elastic parts 6 configured between the outer circumferential convex parts 3f and the inner circumferential convex parts 4*d* on a rotation direction side of the advancing outer circumferential convex parts 3*f* can be increased. Therefore, the compression (elastic) energy adequate for use as the propulsion force can be accumulated in the elastic parts 6. The sinking may be 2% to 5% relative to a volume of the elastic parts 6, because compression of the elastic parts 6 may become inadequate when the sinking is too large.

(Use Example of Rotation Transmission Mechanism)

Figure 7:
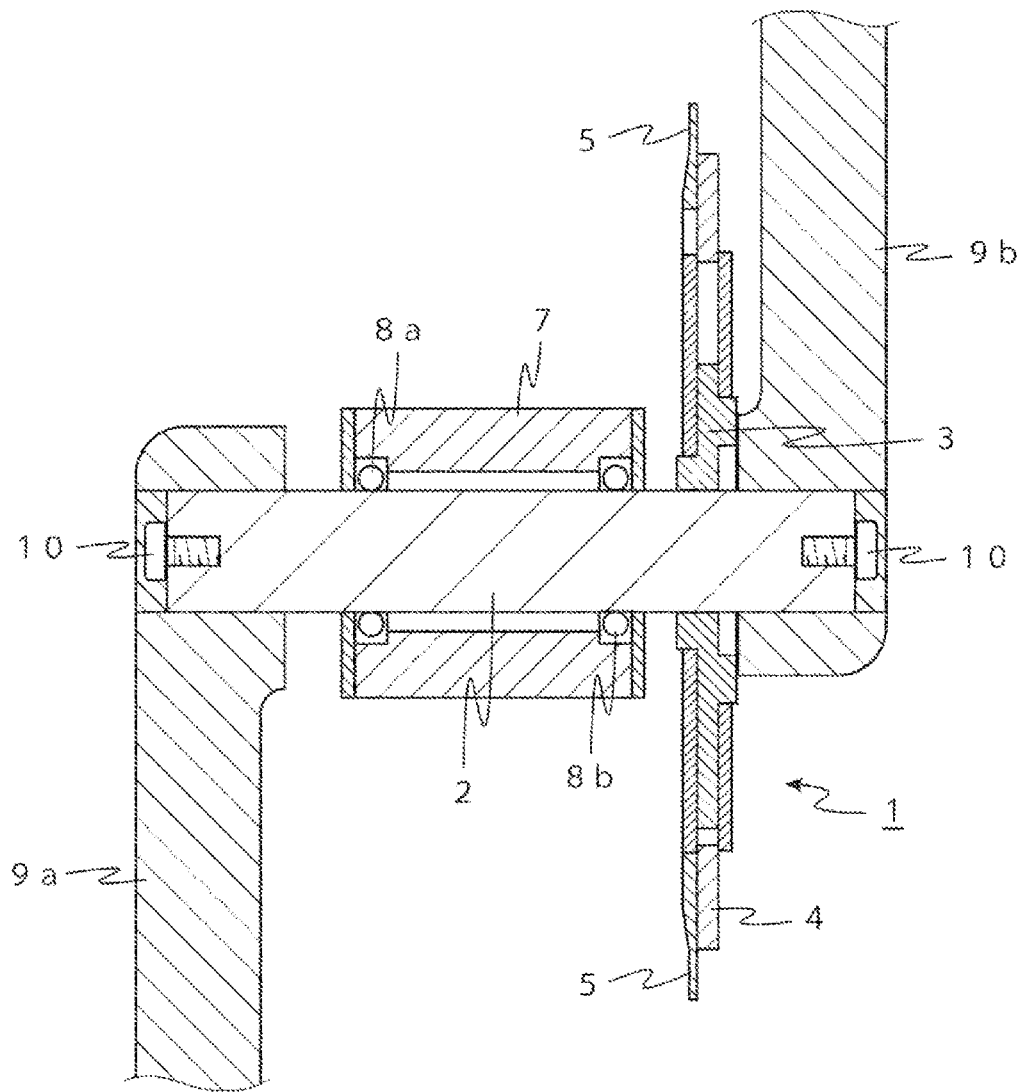
FIG. 7 is a sectional top view illustrating a main part in an example of using a rotational apparatus in embodiment I of the present disclosure for a bicycle.
Figure 8:
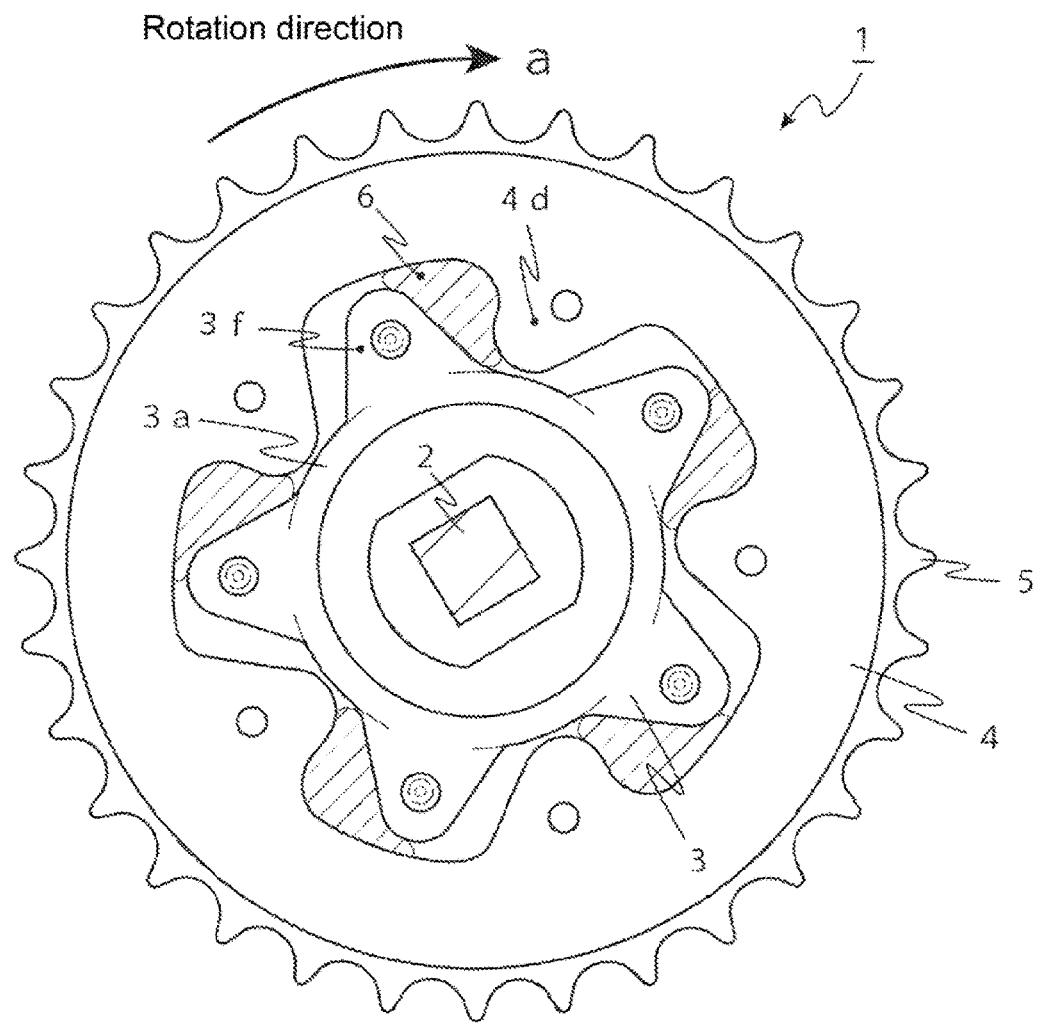
FIG. 8 is a surface diagram illustrating a state after removing a cover part of a rotational apparatus in embodiment I of the present disclosure and a state after generating elastic deformation (compression deformation) by elastic parts.

Next, with reference to FIG. 7 and FIG. 8, a use example of the rotational apparatus 1 in the present embodiment is described.

FIG. 7 is a sectional top view illustrating a main part in an example of using a rotational apparatus in embodiment I of the present disclosure for a bicycle. FIG. 8 is a surface diagram illustrating a state after removing a cover part 4*c* of a rotational apparatus and a state after generating elastic deformation (compression deformation) by elastic parts.

As shown in FIG. 7, the crankshaft 2 of the bicycle as the rotating shaft is kept at a crankshaft keeping part 7 integral with a bicycle framework through a left ball bearing and a right ball bearing 8*a* and 8*b* in a rotation manner. A right end part of the crankshaft 2 is inserted and fixed to a through hole for inserting crankshaft 3*e* of the internal rotation member 3 (with reference to FIG. 3). Thus, the rotational apparatus 1 is assembled and connected to the right end part of the crankshaft 2. In addition, crank arms 9*a* and 9*b* are fixed to a left end and a right end of the crankshaft 2 in a phase difference of 180°. In FIG. 7, a reference numeral 10 refers to a crank arm fixing member used for fixing the crank arms 9*a* and 9*b* to the crankshaft 2. The crankshaft 2 and a four-corner cylinder of the through hole for inserting crankshaft 3*e* of the internal rotation member 3 are embedded and rotated integrally.

rotation pedals (not shown) are configured at end parts of the crank arms 9*a* and 9*b*.

With reference to FIG. 6 to FIG. 8, actions of the rotational apparatus 1 assembled and connected to the crankshaft 2 of the bicycle as mentioned above are described.

In FIG. 7, when a bicyclist pedals the pedals (not shown) configured at the end parts of the crank arms 9*a* and 9*b*, the outer circumferential convex parts 3*f* protruded on the outer circumference of the internal rotation member body 3*a* are rotated together with the crankshaft 2 in a direction of an arrow a shown in FIG. 6 and FIG. 8.

As a result, the internal rotation member 3 rotates in the rotation direction by a relative angle of 4° to 30° relative to the external rotation member 4. in the relative angle, regardless of a pedaling force, the relative angle is not increased above the relative angle somewhere and the internal rotation member 3 and the external rotation member 4 start to rotate integrally.

Then, when the crankshaft 2 rotates and the outer circumferential convex parts 3*f* approach the inner circumferential convex parts 4*d*, the elastic parts 6 are compressed since clamped between the outer circumferential convex parts 3*f* and the inner circumferential convex parts 4*d*; and part of input energy is accumulated in the elastic parts 6.

At an initial rotation stage of the crankshaft 2 (FIG. 6 to FIG. 8), the elastic parts 6 generate elastic deformation. However, after deformation, the rotating force of the crankshaft 2 is transmitted from the outer circumferential convex parts 3*f* to the inner circumferential convex parts 4*d*; approximately integral rotation is performed from the crankshaft 2 to the chain ring 5; and a chain (not shown) arranged on the chain ring 5 is tensioned to reliably transmit rotation to a sprocket at a back wheel side.

The elastic parts 6 that generate elastic deformation (compression deformation) are restored when input from the pedals is interrupted and weakened, and press the inner circumferential convex parts 4*d* as restored energy, so that the external rotation member 4 and the chain ring 5 rotate to an advancing direction. Namely, the compression (elastic) energy of the elastic parts 6 is converted into rotation energy and is used as a propulsion force of the bicycle.

By strongly pedaling the pedals at the end parts of the cranks 9*a* and 9*b*, the relative angle is increased and more elastic energy can be accumulated. However, in the rotational apparatus of the present disclosure, since an initial pedaling force is consumed on compression of an elastic body and will not become the propulsion force, when the relative angle is greater than 30°, idling of the cranks at the beginning of pedaling becomes too large. The effect of the present disclosure is reduced. Therefore, ideally: even pedaling at a maximum torque considered from a foot force of the bicyclist, the relative angle does not exceed 30°. In addition, when the relative angle is less than 4°, the elastic energy accumulated in the elastic body is less.

Therefore, the effect of the present disclosure is still reduced. Therefore, ideally: at the time of pedaling at a general torque considered from the foot force of the bicyclist, the relative angle is greater than 4°. It should be noted that in the present embodiment, five outer circumferential convex parts 3*f* and five inner circumferential convex parts 4*d* are respectively arranged. Therefore, when the initial stage shown in FIG. 6 is changed to a compression state shown in FIG. 8, the elastic body 6 is compressed within a range of 1% to 3%.

Figure 9:
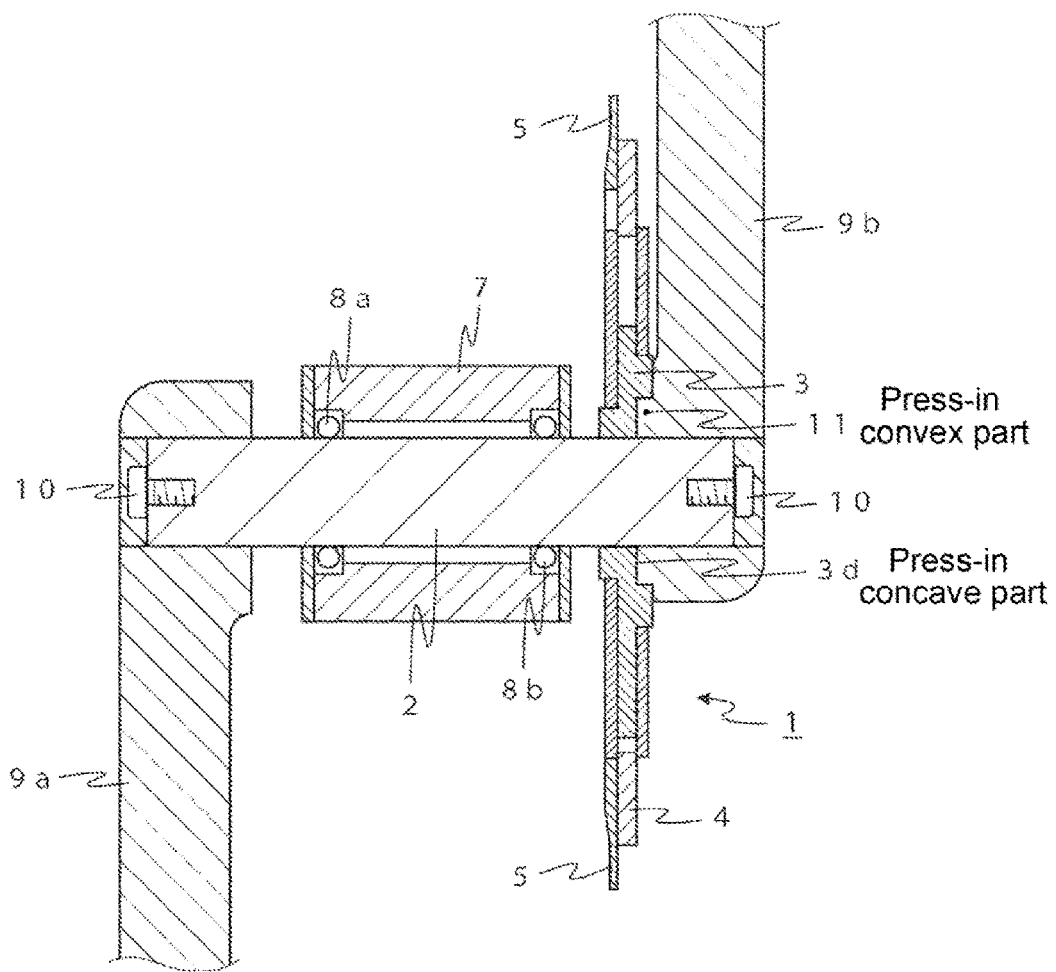
FIG. 9 is a sectional top view illustrating a main part in another example of using a rotational apparatus in embodiment I of the present disclosure for a bicycle.

It should be noted that in the present embodiment, a condition that the crank arms 9*a* and 9*b* are only fixed to the left end and the right end of the crankshaft 2 is taken as an example for description, but is not necessarily limited to such composition. For example, also like FIG. 9, a press-in convex part 11 is arranged on the surface of the crank arm 9*b* opposite to the rotational apparatus 1; a press-in convex part 11 is pressed into a press-in concave part 3*d* of the internal rotation member 3; and the crank arm 9*b* is fixed to the right end of the crankshaft 2. According to the composition, the crank arm 9*b* and the internal rotation member 3 can be completely integrated. Therefore, a pedaling action on the pedal can be reliably converted into a rotation action of the outer circumferential convex parts 3*f* of the internal rotation member 3.

In addition, in the present embodiment, a condition that five outer circumferential convex parts 3*f* and five inner circumferential convex parts 4*d* are respectively arranged is taken as an example for description, but is not necessarily limited to such composition. A number of the outer circumferential convex parts 3*f* and a number of the inner circumferential convex parts 4*d* are respectively one or more. However, to circumferentially transmit accumulated force of the elastic parts 6, the number of the outer circumferential convex parts 3*f* and the number of the inner circumferential convex parts 4*d* may be more than four. In addition, to fully ensure the volume of the elastic parts 6, the number of the outer circumferential convex parts 3*f* and the number of the inner circumferential convex parts 4*d* may be less than eight.

In addition, in the present embodiment, a condition that the outer circumferential convex parts 3*f* and the internal rotation member body 3*a* are integrally formed is taken as an example for description, but is not necessarily limited to such composition. The outer circumferential convex parts can also be fixedly arranged on the internal rotation member body.

In addition, in the present embodiment, a condition that the inner circumferential convex parts 4d and the circular ring part 4b are integrally formed is taken as an example for description, but is not necessarily limited to such composition. The inner circumferential convex parts can also be fixedly arranged on the circular ring part.

In addition, in the present embodiment, a condition that the elastic parts 6 are made of synthetic rubber is taken as an example for description, but is not necessarily limited to such composition.

As long as the elastic parts can generate elastic deformation (compression deformation) when the internal rotation member 3 and the external rotation member 4 rotate and can transmit rotation between the internal rotation member 3 and the external rotation member 4 after deformation, deformation, an elastic modulus and the like of the elastic parts can be properly selected according to preference of a user. As the elastic parts, besides the synthetic rubber, for example, gas and the like enclosed between the outer circumferential convex parts 3f and the inner circumferential convex parts 4d can also be used.

In addition, in the present embodiment, the rotational apparatus 1 for the bicycle is taken as an example for description, but the rotational apparatus of the present disclosure is not necessarily limited to such use. The rotational apparatus of the present disclosure can also be used for mechanisms having wheels, such as civil wheelbarrows, wheelchairs, rickshaws, two-wheel trailers and the like, and can obtain a same effect.

[Embodiment II]

(Composition of Rotation Transmission Mechanism)

Figure 10:
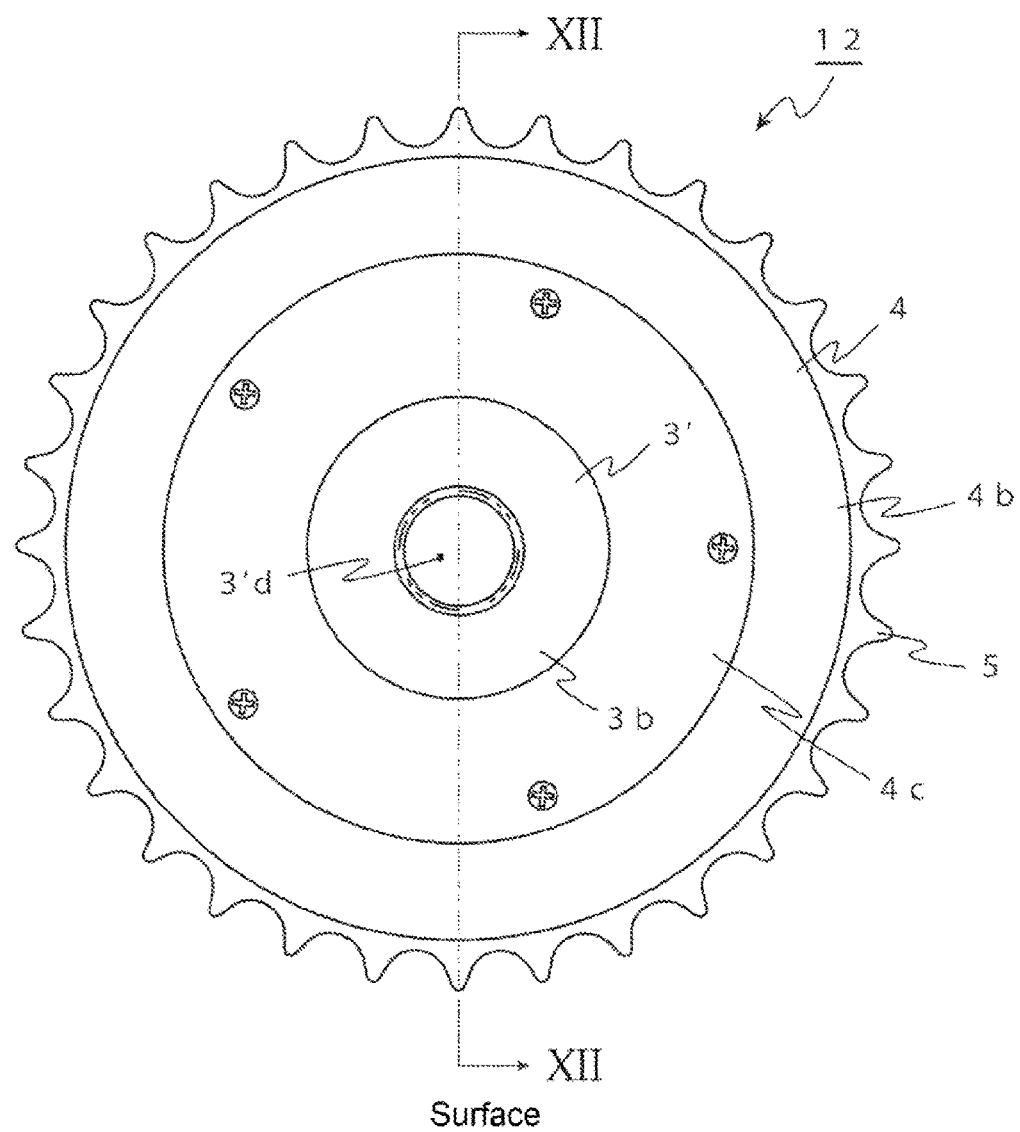
FIG. 10 is a surface diagram illustrating a rotational apparatus in embodiment II of the present disclosure.
Figure 11:
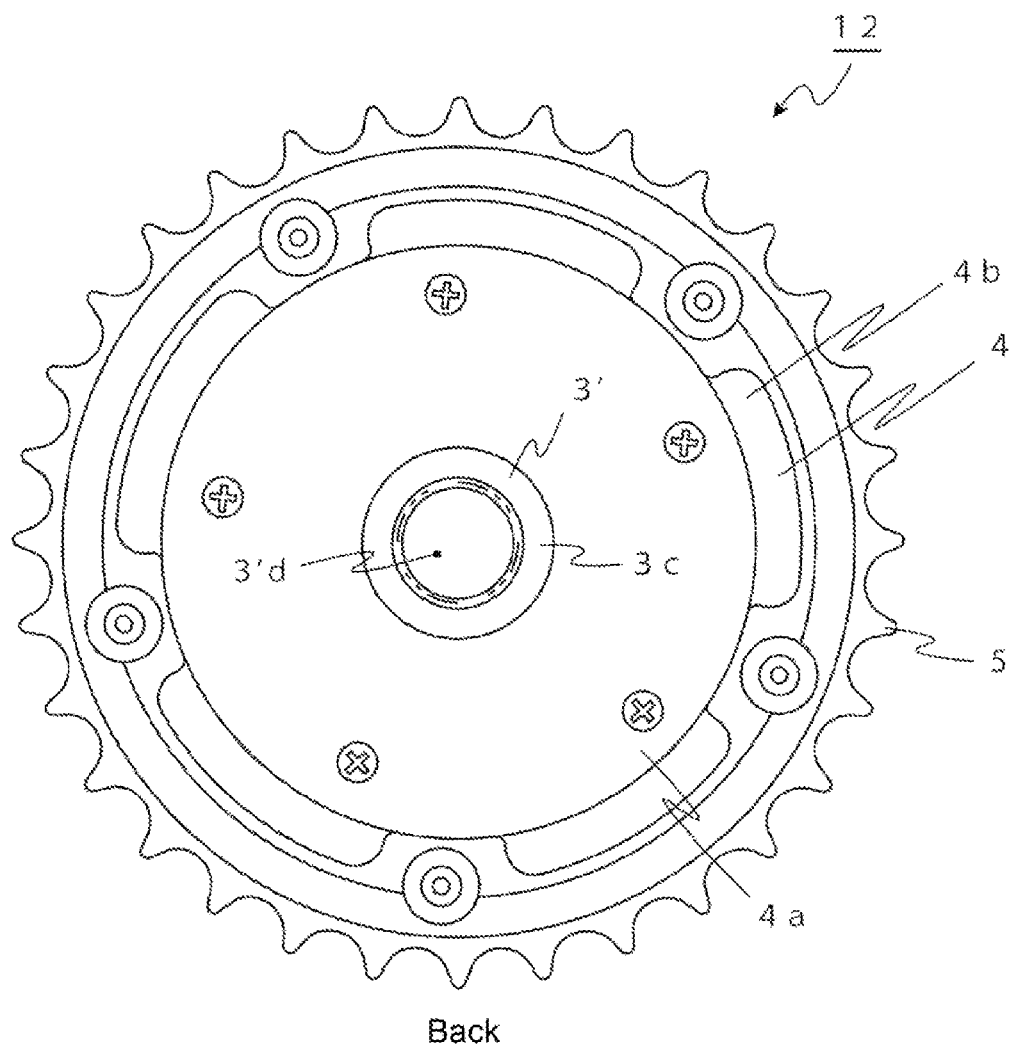
FIG. 11 is a back diagram illustrating a rotational apparatus in embodiment II of the present disclosure.
Figure 12:
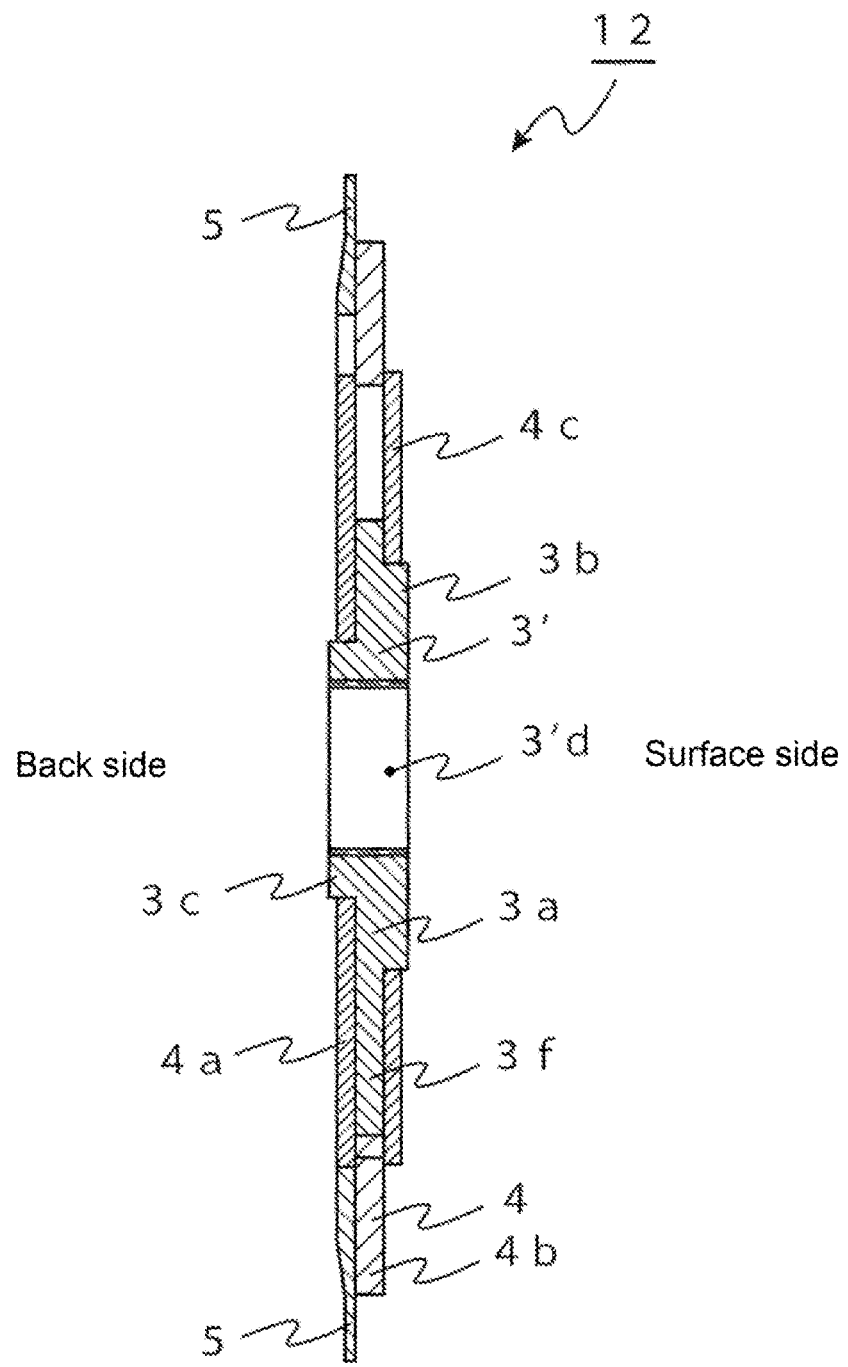
FIG. 12 is a sectional view illustrating XII-XII line in FIG. 10.

Then, with reference to FIG. 10 to FIG. 12, the composition of the rotational apparatus in embodiment II of the present disclosure is described.

FIG. 10 is a surface diagram illustrating a rotational apparatus in embodiment II of the present disclosure. FIG. 11 is a back diagram illustrating a rotation transmission mechanism. FIG. 12 is a sectional view illustrating XII-XII line in FIG. 10.

The rotational apparatus 12 in the present embodiment shown in FIG. 10 to FIG. 12 is different only in composition of the internal rotation member from the rotational apparatus 1 (with reference to FIG. 1 to FIG. 3 and the like) in the above embodiment I. Therefore, identical reference numerals are given to composition members identical with composition members of the rotational apparatus 1 in embodiment I, and will not be described.

As shown in FIG. 10 to FIG. 12, the internal rotation member 3' of the rotational apparatus 12 in the present embodiment includes: a disc-shaped internal rotation member body 3a; low-height cylindrical convex parts 3b and 3c integrally formed on a surface and a back of the internal rotation member body 3a respectively; and splined hole 3'd formed in a manner of penetrating through the convex part 3b, the internal rotation member body 3a and the convex part 3c.

In addition, the internal rotation member 3' includes five outer circumferential convex parts 3f integrally formed with the internal rotation member body 3a and protruding to an outer circumferential side of the internal rotation member body 3a. Bearing balls 3g and 3h (with reference to FIG. 4 and FIG. 5) are rotatably kept on the surfaces and the backs of the outer circumferential convex parts 3f respectively.

(Use Example of Rotation Transmission Mechanism)

Figure 13:
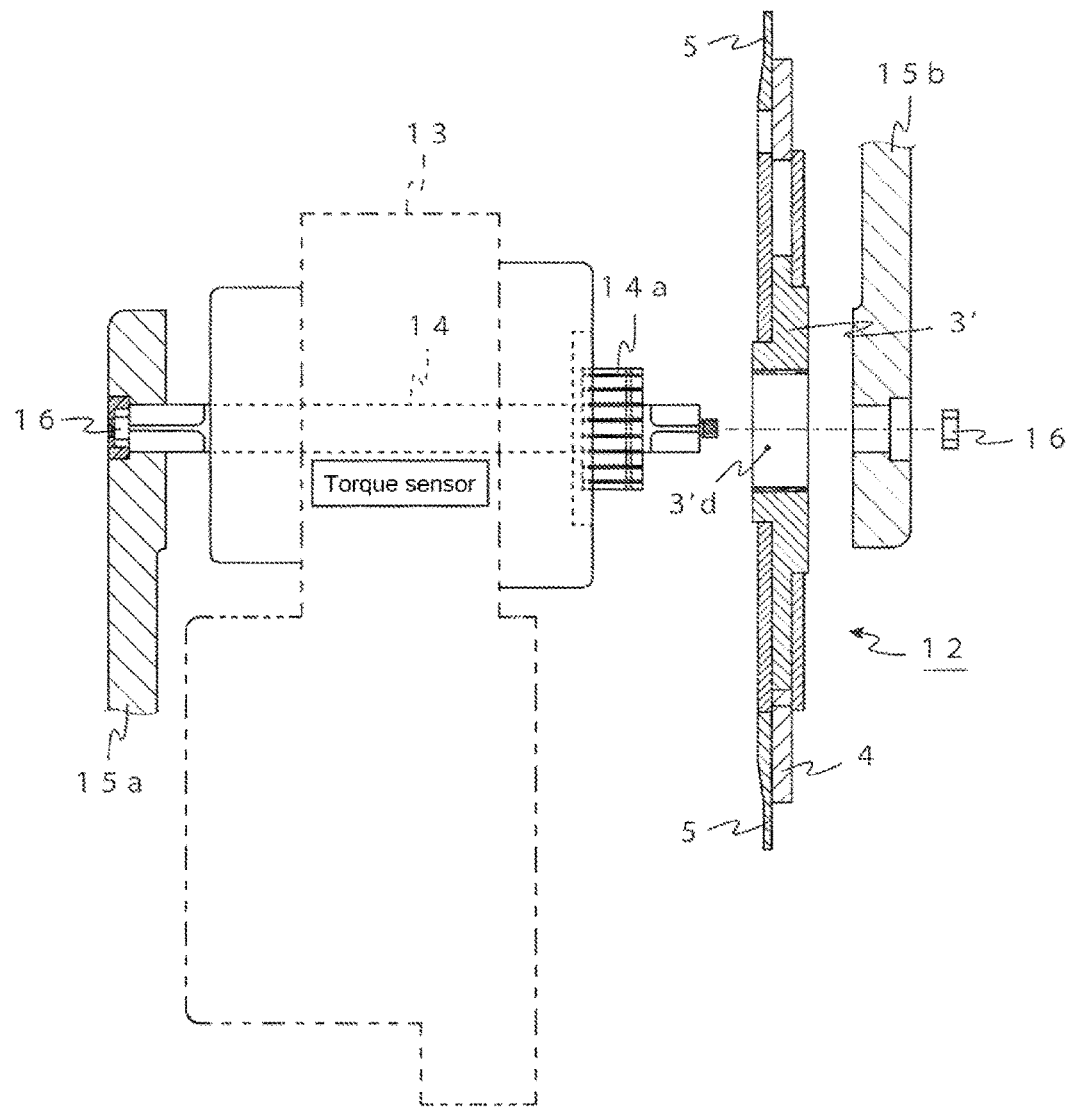
FIG. 13 is a sectional exploded top view illustrating a main part in an example of using a rotational apparatus in embodiment II of the present disclosure for an electric auxiliary bicycle.
Figure 14:
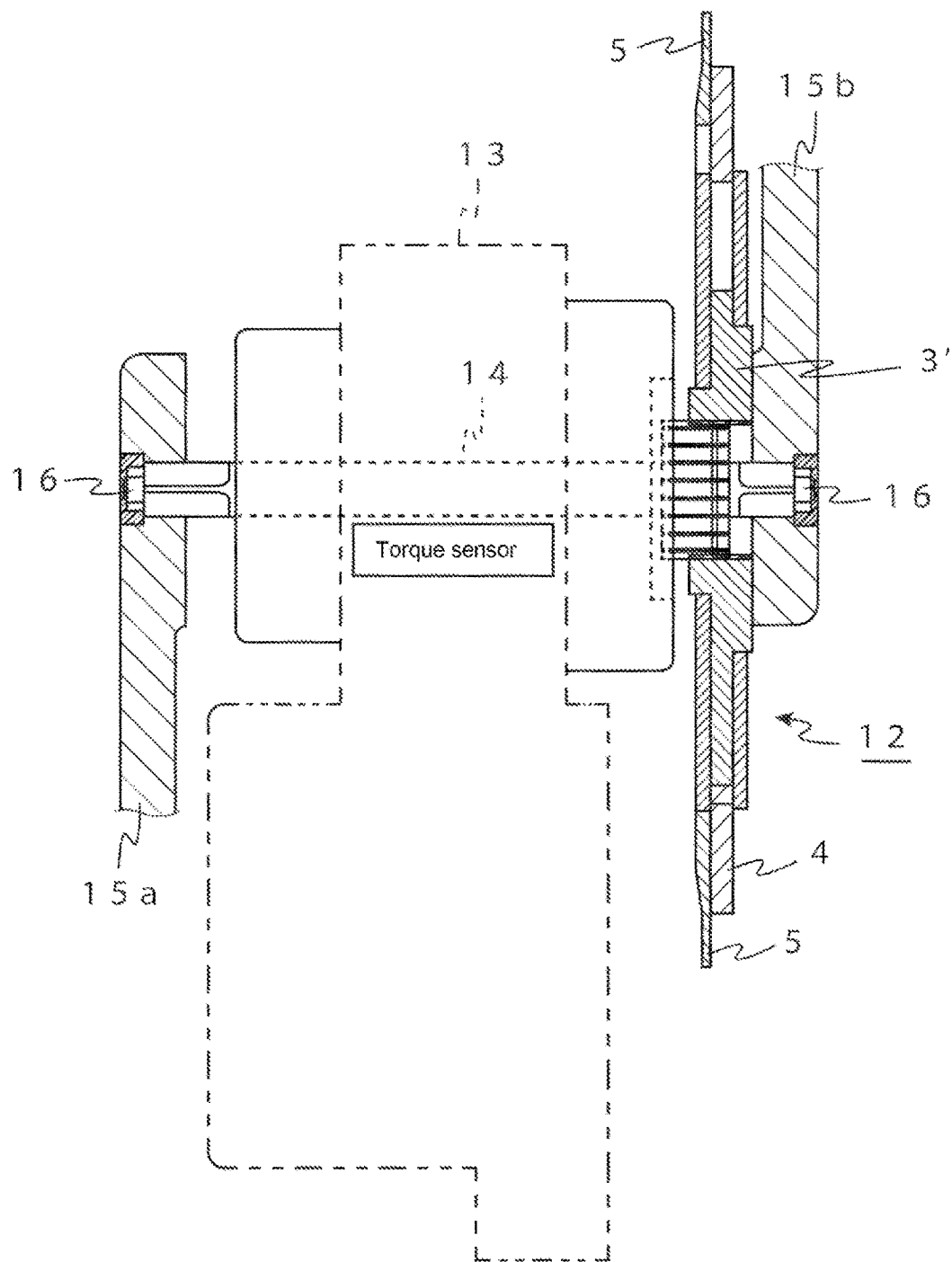
FIG. 14 is a sectional top view illustrating a main part in an example of using a rotational apparatus in embodiment II of the present disclosure for an electric auxiliary bicycle.

Then, with reference to FIG. 13 to FIG. 14, a use example of the rotational apparatus 12 in the present embodiment is described.

FIG. 13 is a sectional exploded top view illustrating a main part in an example of using a rotational apparatus in embodiment II of the present disclosure for an electric auxiliary bicycle. FIG. 14 is a sectional top view illustrating a main part in an example of using a rotational apparatus for an electric auxiliary bicycle.

The rotational apparatus 12 in the present embodiment is assembled and connected to the crankshaft of the electric auxiliary bicycle for use.

As shown in FIG. 13 and FIG. 14, at a motor driving unit 13 of the electric auxiliary bicycle, the crankshaft 14 as the rotating shaft is kept in a left and right penetrating state in a rotation manner. At the right end part of the crankshaft 14, a spline 14a embedded with the splined hole 3'd of the internal rotation member 3' is fixedly connected concentrically with the crankshaft 14. The spline 14a is inserted into the splined hole 3'd of the internal rotation member 3'. Thus, the rotational apparatus 12 is assembled and connected to the right end part of the crankshaft 14. In addition, crank arms 15a and 15b are fixed to a left end and a right end of the crankshaft 14 in a phase difference of 180°. In FIG. 13 and FIG. 14, a reference numeral 16 refers to a crank arm fixing member used for fixing the crank arms 15a and 15b to the crankshaft 14.

Free rotation pedals (not shown) are configured at end parts of the crank arms 15a and 15b.

In the motor driving unit 13, a torque sensor is configured in a position near the crankshaft 14, so that a human driving force generated by a pedaling force from the pedals can be detected through the torque sensor. Then, a motor can be driven according to a detection result of the torque sensor and rotation of the crankshaft 14 can be assisted (auxiliary driving force).

Actions of the rotational apparatus 12 assembled and connected to the crankshaft 14 of the electric auxiliary bicycle are approximately the same as the condition in the embodiment I. However, the difference from the condition in the embodiment I is that the human driving force generated by the pedaling force from the pedals is detected through the torque sensor, and the auxiliary driving force (auxiliary force) of the motor corresponding to the human driving force is applied. Thus, easy traveling can be realized even in a steep ramp. Then, fatigue of a bicyclist can be obviously alleviated in a manner that the rotational apparatus of the present disclosure is assembled and connected to the crankshaft of the electric auxiliary bicycle for use.

In the present embodiment, the torque sensor is arranged in the motor driving unit 13, but can also be arranged in the crank arms 15. Although the crank arms 15 are rigid bodies formed by metal such as iron and the like, the crank arms 15 may be slightly deformed due to the pedaling force. A torque can be sensed by sensing a size of the deformation. Through such composition, compared with a condition that the torque sensor is arranged in the motor driving unit 13, a pedaling torque of the bicyclist except for an influence of the restored energy of the elastic body can be extracted and sensed only. Therefore, a response to the actions of the bicyclist can be further increased. For example, when the bicycle is pedaled, under a condition of needing hard braking, if the torque sensor is configured in the motor driving unit 13, even if pedaling is stopped for braking, the torque generated by the restored energy can also be sensed until the elastic body is restored. Therefore, stop of the motor is slightly delayed. By configuring the torque sensor between the rotational apparatus and feet like the crank arms 15, the torque generated by the foot force can be sensed only, thereby increasing safety. However, the torque sensor for sensing the deformation of the crank has higher price, and needs to be arranged on the left crank and the right crank. Therefore, cost is increased. If the torque sensor is arranged in the motor driving unit 13, a cheaper torque sensor is adequate. Therefore, low cost can be further realized.

[Embodiment III]

(Composition of Rotation Transmission Mechanism)

Next, with reference to FIG. 15 to FIG. 18, the composition of the rotational apparatus in embodiment III of the present disclosure is described.

Figure 15:
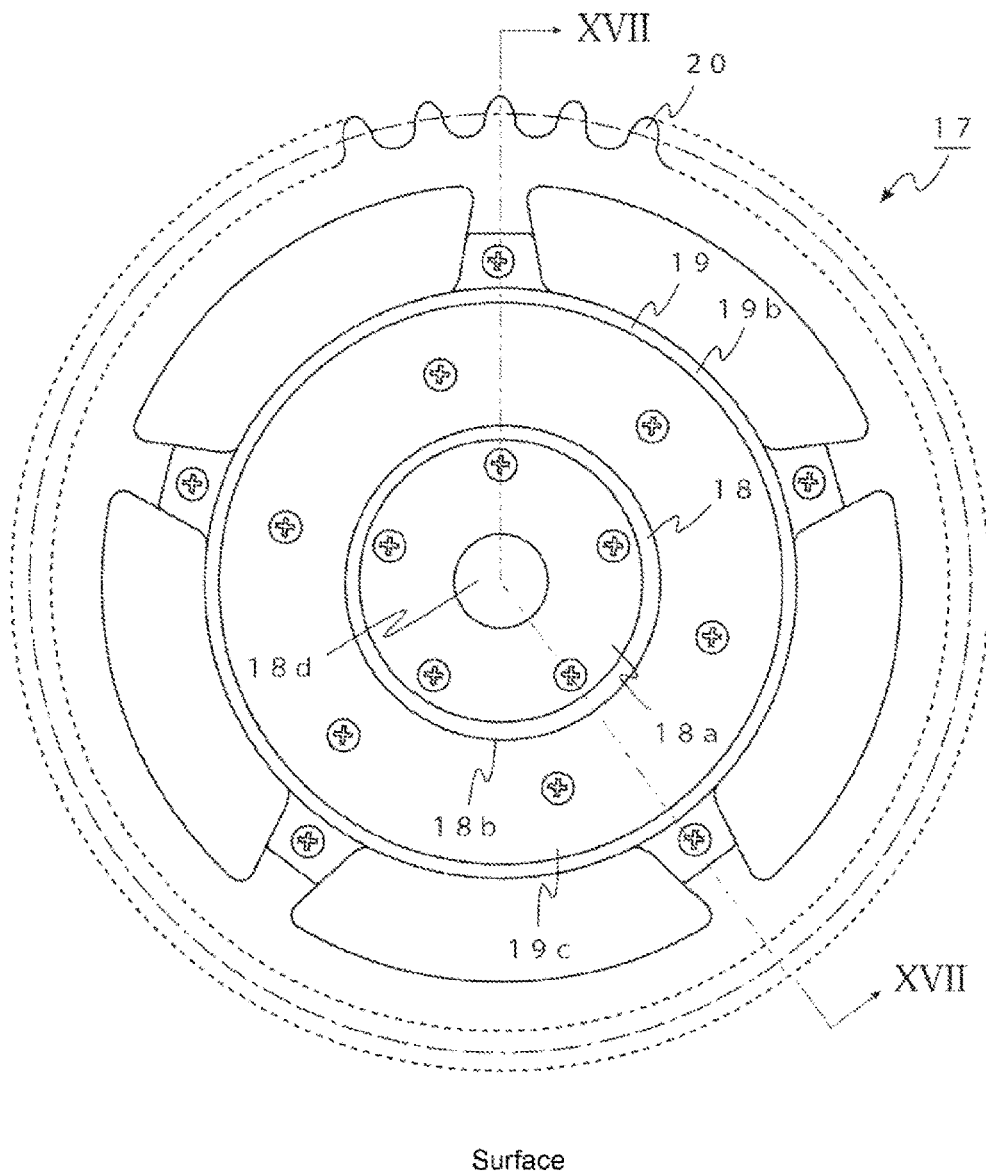
FIG. 15 is a surface diagram illustrating a rotational apparatus in embodiment III of the present disclosure.
Figure 16:
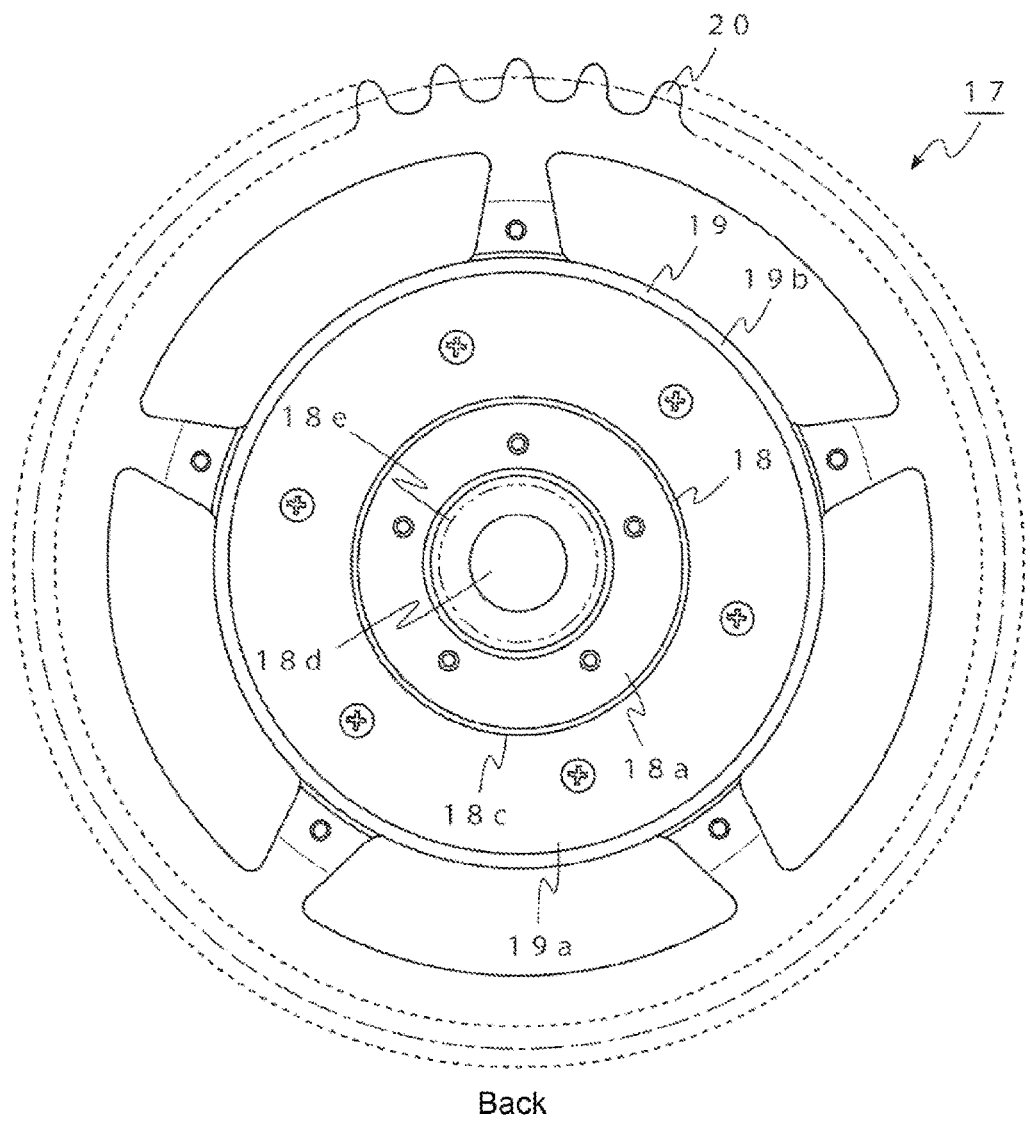
FIG. 16 is a back diagram illustrating a rotational apparatus in embodiment III of the present disclosure.
Figure 17:
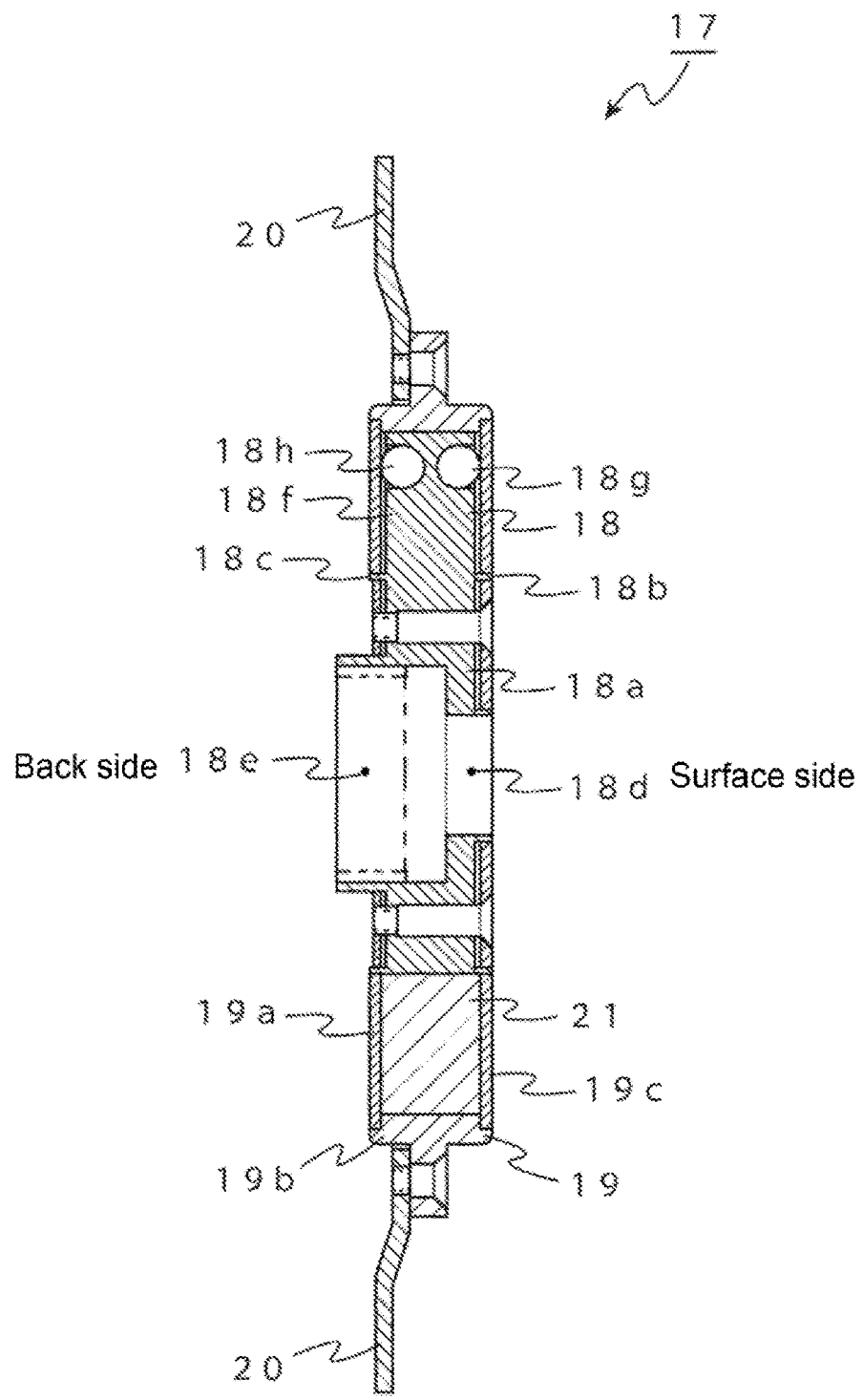
FIG. 17 is a sectional view illustrating XVII-XVII line in FIG. 15.
Figure 18:
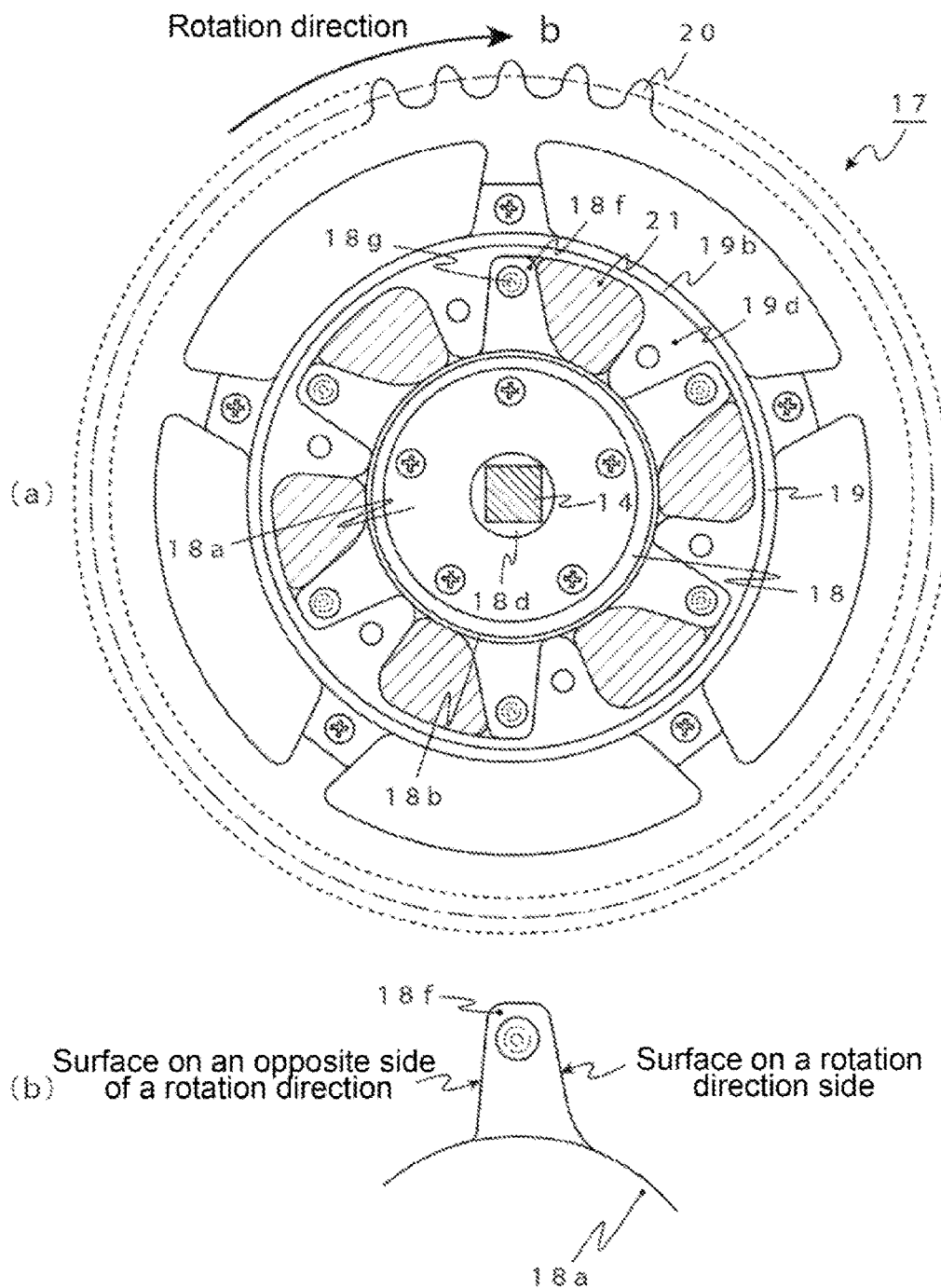
FIG. 18 is a surface diagram illustrating a state after removing a cover part of a rotational apparatus in embodiment III of the present disclosure.

FIG. 15 is a surface diagram illustrating a rotational apparatus in embodiment III of the present disclosure. FIG. 16 is a back diagram illustrating a rotation transmission mechanism. FIG. 17 is a sectional view illustrating XVII-XVII line in FIG. 15. FIG. 18 is a surface diagram illustrating a state after removing a cover part of a rotation transmission mechanism.

As shown in FIG. 15 to FIG. 18, the rotational apparatus 17 in the present embodiment includes: an internal rotation member 18 inserted by a rotating shaft such as a crankshaft and the like of an electric auxiliary bicycle; and an external rotation member 19 configured on the internal rotation member 18 in a rotation manner.

The internal rotation member 18 includes: a disc-shaped internal rotation member body 18*a*; low-height cylindrical convex parts 18*b* and 18*c* integrally formed on outer circumferences of a surface and a back of the internal rotation member body 18*a* respectively; and a through hole for inserting crankshaft 18*d* formed in a manner of penetrating through the internal rotation member body 18*a*. Herein, a splined hole 18*e* is formed in the back side of the through hole for inserting crankshaft 18*d*.

In addition, the internal rotation member 18 includes six outer circumferential convex parts 18*f* integrally formed with the internal rotation member body 18*a* and protruding to an outer circumferential side of the internal rotation member body 18*a*. Bearing balls 18*g* and 18*h* are rotatably kept on the surfaces and the backs of the outer circumferential convex parts 18*f* respectively. The balls 18*g* and 18*h* are located at a position of 45% to 65% relative to a radial protruding height of the outer circumferential convex parts 18*f*, preferably at a position of 58% to 62%.

The external rotation member 19 includes: a side plate part 19*a*, located in a side position of the outer circumferential convex parts 18*f* of the internal rotation member 18 and inserted into the convex part 18*c* of the internal rotation member 18 in a rotation manner; a circular ring part 19*b* fixed to an outer circumference of the side plate part 19*a* through screws at the outer side of the outer circumferential convex parts 18*f* of the internal rotation member 18; and a cover part 19*c* inserted into the convex part 18*b* in a rotation manner in a state of being configured oppositely to the side plate part 19*a*. It should be noted that at the internal rotation member 18, the bearing balls 18*g* and 18*h* kept at the surfaces and the backs of the outer circumferential convex parts 18*f* are respectively rolled and simultaneously rotated on the cover part 19*c* and the side plate part 19*a*. Thus, the internal rotation member 18 can be smoothly rotated.

In addition, the external rotation member 19 includes six inner circumferential convex parts 19*d* integrally formed with the circular ring part 19*b* in a manner of protruding to an inner circumferential side of the circular ring part 19*b* and configured alternately with the outer circumferential convex parts 18*f* of the internal rotation member 18. The side plate part 19*a* and the cover part 19*c* are fixed to the inner circumferential convex parts 19*d* through screws.

Moreover, a chain ring 20 is fixedly arranged at an outer circumferential part of a back side of the circular ring part 19*b* of the external rotation member 19.

As shown in FIG. 18(*a*), elastic parts 21 made of synthetic rubber are configured between the outer circumferential convex parts 18*f* and the inner circumferential convex parts 19*d* on a rotation direction side of the advancing outer circumferential convex parts 18*f*. When the internal rotation member 18 and the external rotation member 19 rotate, the elastic parts 21 are clamped between the outer circumferential convex parts 18*f* and the inner circumferential convex parts 19*d* and generate elastic deformation (compression deformation). Herein, lateral deformation of the elastic parts 21 is prevented by the side plate part 19*a* and the cover part 19*c*. Thus, part of input energy can be efficiently accumulated in the elastic parts 21.

As shown in FIG. 18(*b*), in the rotational apparatus 17 in the present embodiment, the surface on the rotation direction side of the outer circumferential convex parts 18*f* is greater than the surface on the opposite side of the rotation direction by about 10% to 15%, for example about 12% to 13%. Therefore, the elastic parts 21 configured between the outer circumferential convex parts 18*f* and the inner circumferential convex parts 19*d* on a rotation direction side of the advancing outer circumferential convex parts 18*f* generate compression deformation within a range greater than an existing art to efficiently accumulate compression (elasticity) energy in the elastic parts 6. The compression (elastic) energy is converted into rotation energy and is used as a propulsion force of an electric auxiliary bicycle and the like.

More specifically, the outer circumferential convex parts 18*f* are formed in such a manner that the surface on the rotation direction side is inclined more gently than the surface on the opposite side of the rotation direction, and a fillet is formed on a boundary part between the surface on the rotation direction side and the internal rotation member body 18*a*. By setting such a shape, the surface on the rotation direction side of the outer circumferential convex parts 18*f* is increased. Thus, a height of the outer circumferential convex parts 18*f* is lowered and miniaturization of the rotational apparatus 17 can be attempted. In addition, a compression distance of the elastic part 21 is increased towards the outer circumferential side. Therefore, more compression energy can be accumulated.

The surface in the inner circumferential convex parts 19*d* opposite to the surface on the rotation direction side of the outer circumferential convex parts 18*f* is formed in a sunken state. Therefore, a number of the elastic parts 21 configured between the outer circumferential convex parts 18*f* and the inner circumferential convex parts 19*d* on a rotation direction side of the advancing outer circumferential convex parts 18*f* can be increased. Therefore, the compression (elastic) energy adequate for use as the propulsion force can be accumulated in the elastic parts 21. The sinking may be 2% to 5% relative to a volume of the elastic parts 21 because compression of the elastic parts 21 may become inadequate when the sinking is too large. In the present embodiment, six outer circumferential convex parts 18*f* and six inner circumferential convex parts 19*d* are respectively arranged.

(Use Example of Rotation Transmission Mechanism)

Figure 19:
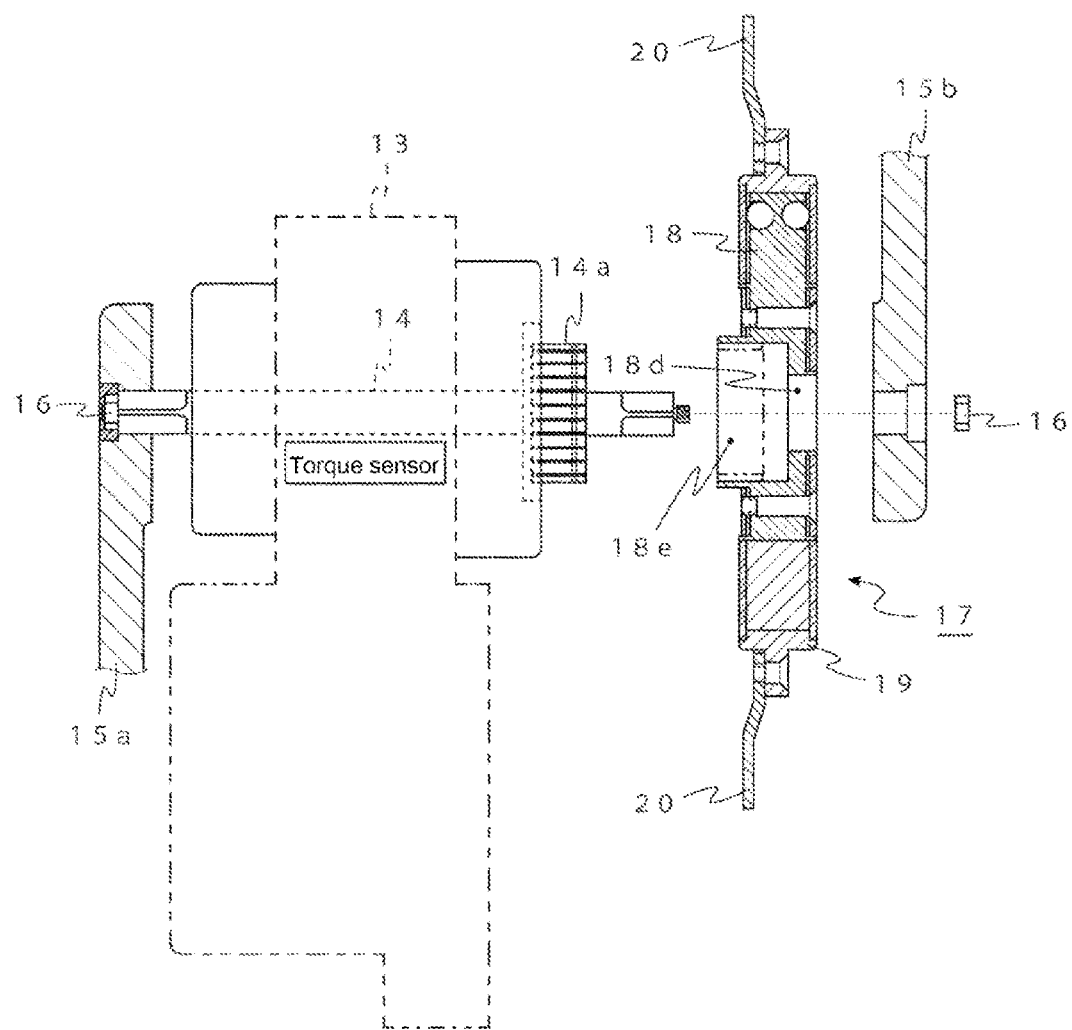
FIG. 19 is a sectional exploded top view illustrating a main part in an example of using a rotational apparatus in embodiment III of the present disclosure for an electric auxiliary bicycle.
Figure 20:
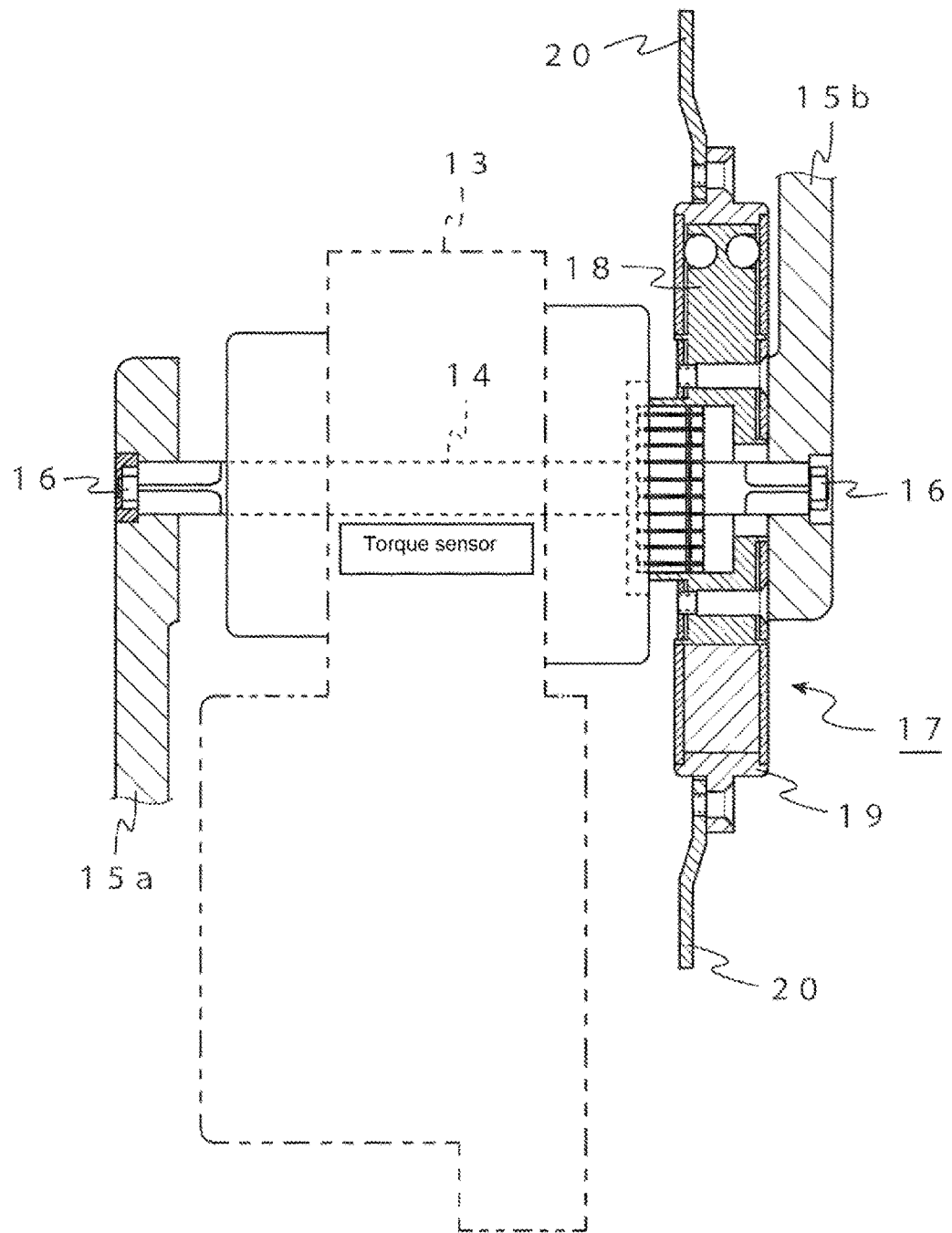
FIG. 20 is a sectional top view illustrating a main part in an example of using a rotational apparatus in embodiment III of the present disclosure for an electric auxiliary bicycle.
Figure 21:
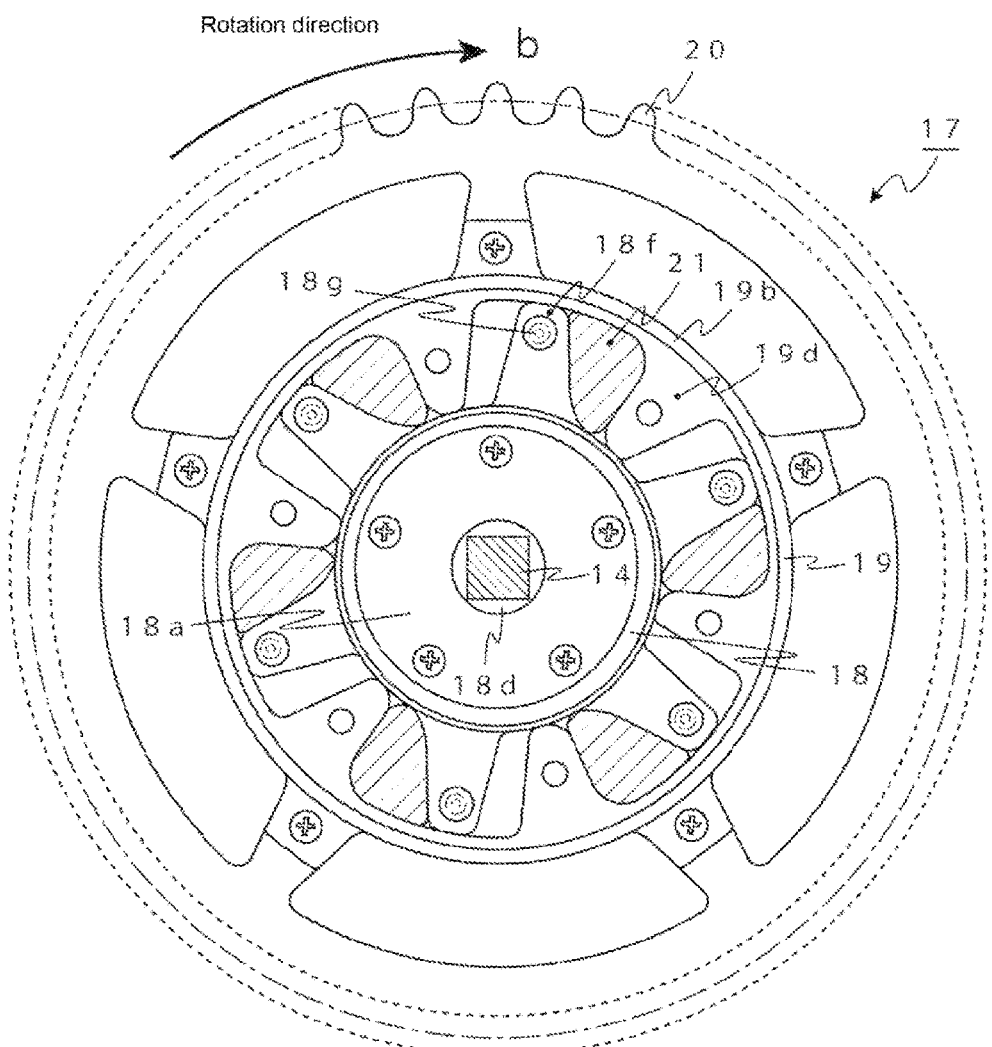
FIG. 21 is a surface diagram illustrating a state after removing a cover part of a rotational apparatus in embodiment III of the present disclosure and a state after generating elastic deformation (compression deformation) by elastic parts.

Next, also with reference to FIG. 19 to FIG. 21, a use example of the rotational apparatus 17 in the present embodiment is described.

FIG. 19 is a sectional exploded top view illustrating a main part in an example of using a rotational apparatus in embodiment III of the present disclosure for an electric auxiliary bicycle. FIG. 20 is a sectional top view illustrating a main part in an example of using a rotational apparatus for an electric auxiliary bicycle. FIG. 21 is a surface diagram illustrating a state after removing a cover part 19c of a rotational apparatus and a state after generating elastic deformation (compression deformation) by elastic parts.

The rotational apparatus 17 in the present embodiment is assembled and connected to the crankshaft of the electric auxiliary bicycle for use.

As shown in FIG. 19 and FIG. 20, at a motor driving unit 13 of the electric auxiliary bicycle, the crankshaft 14 as the rotating shaft is kept in a left and right penetrating state in a rotation manner. At the right end part of the crankshaft 14, a spline 14a embedded with the splined hole 18e of the internal rotation member 18 is fixedly connected concentrically with the crankshaft 14. The spline 14a is inserted into the splined hole 18e of the internal rotation member 18. Thus, the rotational apparatus 17 is assembled and connected to the right end part of the crankshaft 14. In addition, crank arms 15a and 15b are fixed to a left end and a right end of the crankshaft 14 in a phase difference of 180°. In FIG. 19 and FIG. 20, a reference numeral 16 refers to a crank arm fixing member used for fixing the crank arms 15a and 15b to the crankshaft 14.

rotation pedals (not shown) are assembled at end parts of the crank arms 15a and 15b.

In the motor driving unit 13, a torque sensor is configured in a position near the crankshaft 14, so that a human driving force generated by a pedaling force from the pedals can be detected through the torque sensor. Then, a motor can be driven according to a detection result of the torque sensor and rotation of the crankshaft 14 can be assisted (auxiliary driving force).

With reference to FIG. 18 to FIG. 21, actions of the rotational apparatus 17 assembled and connected to the crankshaft 14 of the electric auxiliary bicycle as mentioned above are described.

In FIG. 20, when a bicyclist pedals the pedals (not shown) configured at the end parts of the crank arms 15a and 15b, the outer circumferential convex parts 18f protruded on the outer circumference of the internal rotation member body 18a are rotated together with the crankshaft 14 in a direction of an arrow b shown in FIG. 18 and FIG. 21.

Then, when the crankshaft 14 rotates and the outer circumferential convex parts 18f approach the inner circumferential convex parts 19d, the elastic parts 21 are compressed since clamped between the outer circumferential convex parts 18f and the inner circumferential convex parts 19d; and part of input energy is accumulated in the elastic parts 21.

At an initial rotation stage of the crankshaft 14 (FIG. 18 to FIG. 21), the elastic parts 21 generate elastic deformation. However, after deformation, the rotating force of the crankshaft 14 is transmitted from the outer circumferential convex parts 18f to the inner circumferential convex parts 19d; approximately integral rotation is performed from the crankshaft 14 to the chain ring 20; and a chain (not shown) arranged on the chain ring 20 is tensioned to reliably transmit rotation to a sprocket at a back wheel side.

The elastic parts 21 that generate elastic deformation (compression deformation) are restored when input from the pedals is interrupted and weakened, and press the inner circumferential convex parts 19d as restored energy, so that the external rotation member 19 and the chain ring 20 rotate to an advancing direction. Namely, the compression (elastic) energy of the elastic parts 21 is converted into rotation energy and is used as a propulsion force of an electric auxiliary bicycle.

In addition, the human driving force generated by the pedaling force from the pedals is detected through the torque sensor, and the auxiliary driving force (auxiliary force) of the motor corresponding to the human driving force is applied. Thus, easy traveling can be realized even in a steep ramp.

Fatigue of a bicyclist can be obviously alleviated in a manner that the rotational apparatus of the present disclosure is assembled and connected to the crankshaft of the electric auxiliary bicycle for use.

It should be noted that in the present embodiment, a condition that six outer circumferential convex parts 18f and six inner circumferential convex parts 19d are respectively arranged is taken as an example for description, but is not necessarily limited to such composition. A number of the outer circumferential convex parts 18f and a number of the inner circumferential convex parts 19d are respectively one or more. However, to circumferentially transmit accumulated force of the elastic parts 21, the number of the outer circumferential convex parts 18f and the number of the inner circumferential convex parts 19d may be more than four. In addition, to fully ensure the volume of the elastic parts 21, the number of the outer circumferential convex parts 18f and the number of the inner circumferential convex parts 19d may be less than eight.

In addition, in the present embodiment, a condition that the outer circumferential convex parts 18f and the internal rotation member body 18a are integrally formed is taken as an example for description, but is not necessarily limited to such composition. The outer circumferential convex parts can also be fixedly arranged on the internal rotation member body.

In addition, in the present embodiment, a condition that the inner circumferential convex parts 19d and the circular ring part 19b are integrally formed is taken as an example for description, but is not necessarily limited to such composition. The inner circumferential convex parts can also be fixedly arranged on the circular ring part.

In addition, in the present embodiment, a condition that the elastic parts 21 are made of synthetic rubber is taken as an example for description, but is not necessarily limited to such composition.

As long as the elastic parts can generate elastic deformation (compression deformation) when the internal rotation member 18 and the external rotation member 1 rotate and can transmit rotation between the internal rotation member 18 and the external rotation member 19 after deformation, deformation, an elastic modulus and the like of the elastic parts can be properly selected according to preference of a user. As the elastic parts, besides the synthetic rubber, for example, gas and the like enclosed between the outer circumferential convex parts 18f and the inner circumferential convex parts 19d can also be used.

In addition, in the present embodiment, the rotational apparatus 17 for the electric auxiliary bicycle is taken as an example for description, but the rotational apparatus of the present disclosure is not necessarily limited to such use. The rotational apparatus of the present disclosure can also be used for mechanisms having wheels, such as ordinary bicycles, civil wheelbarrows, wheelchairs, rickshaws, two-wheel trailers and the like, and can obtain a same effect.

In the present embodiment, like the first embodiment, a relative angle between the internal rotation member 18 and the external rotation member 19 is 4° to 30°. In the present embodiment, six pairs of embodiment, six pairs of outer circumferential convex parts 18f and inner circumferential convex parts 19d are arranged. Herein, by increasing the pairs of the outer circumferential convex parts and the inner circumferential convex parts, a compression ratio of the elastic body can be increased, and an elastic coefficient caused by material of the elastic body can be optimized. For example, under a condition that a bicycle is provided with the rotational apparatus of the present disclosure, for example, if a condition of a young male bicyclist with stronger foot force and a condition of children and female bicyclists with weaker foot force are assumed, ranges of loads applied to the pedals are different. Therefore, when pedaling is performed within an assumed load range, it is good to set a number of pairs of the outer circumferential convex parts/inner circumferential convex parts, lengths of the cranks and the elastic coefficient of the elastic body in such a manner that a relative angle between the internal rotation member and the external rotation member is 4° to 30°. However, when the number of the pairs of the outer circumferential convex parts and the inner circumferential convex parts exceeds eight, the elastic body enclosed into a gap is too small. The effect of the present disclosure may be reduced.

[Embodiment IV]

(Composition of Rotation Transmission Mechanism)

Figure 22:
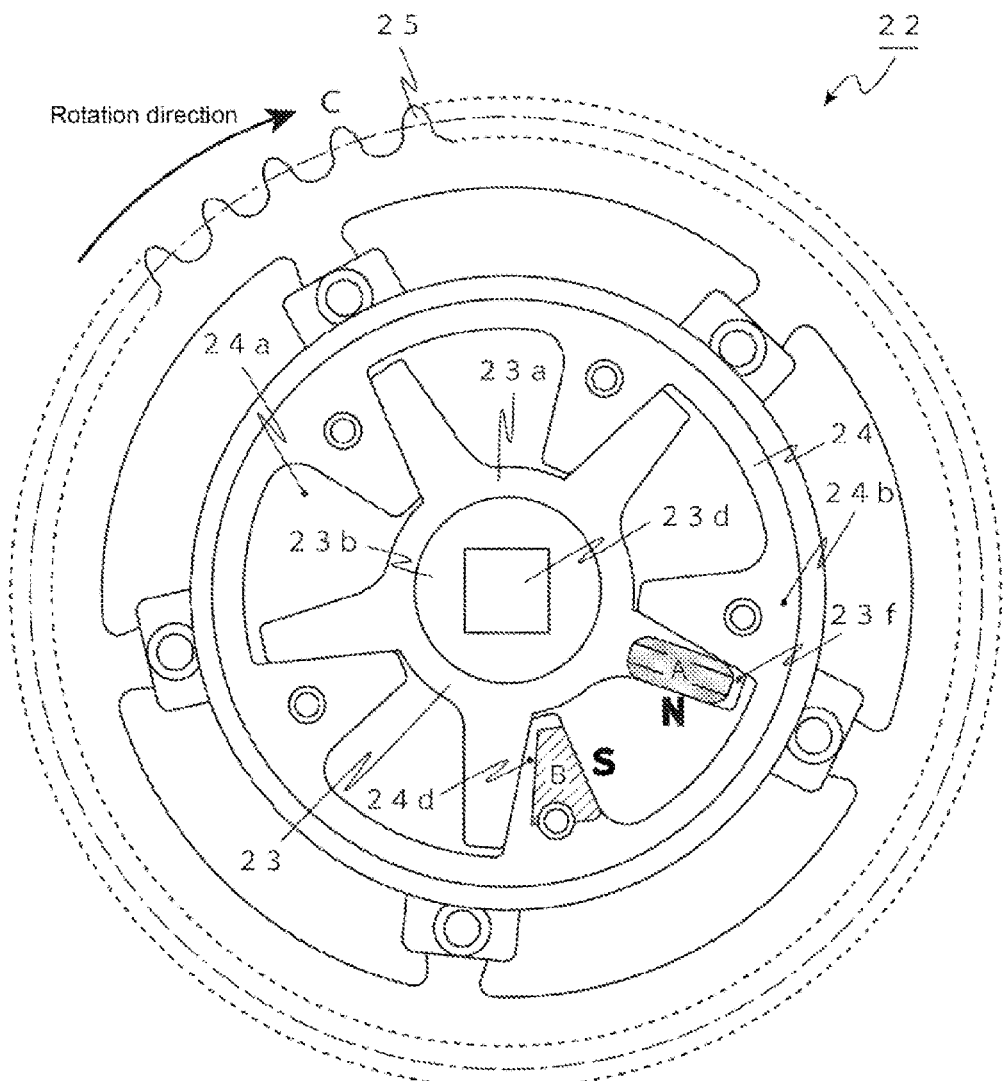
FIG. 22 is a surface diagram illustrating a state after removing a cover part of a rotational apparatus in embodiment IV of the present disclosure.

Next, with reference to FIG. 22, the composition of the rotational apparatus in embodiment IV of the present disclosure is described.

FIG. 22 is a surface diagram illustrating a state after removing a cover part of a rotational apparatus in embodiment IV of the present disclosure.

As shown in FIG. 22, the rotational apparatus 22 in the present embodiment includes: an internal rotation member 23 inserted by, for example, a rotating shaft such as a crankshaft and the like of a bicycle; and an external rotation member 24 configured on the internal rotation member 23 in a rotation manner. Besides the bicycle, the rotational apparatus 22 in the present embodiment can also be used for mechanisms having wheels and robots (joint parts and the like).

The internal rotation member 23 includes: a disc-shaped internal rotation member body 23a; low-height cylindrical convex parts 23b and 23c (the convex part 23c is not shown) integrally formed on outer circumferences of a surface and a back of the internal rotation member body 23a respectively; and a through hole for inserting crankshaft 23d formed in a manner of penetrating through the internal rotation member body 23a.

In addition, the internal rotation member 23 includes five outer circumferential convex parts 23f integrally formed with the internal rotation member body 23a and protruding to an outer circumferential side of the internal rotation member body 23a. Bearing balls (not shown) are rotatably kept on the surfaces and the backs of the outer circumferential convex parts 23f respectively.

The outer circumferential convex parts 23f are formed in such a manner that the surface on the rotation direction side is inclined more gently than the surface on the opposite side of the rotation direction, and a fillet is formed on a boundary part between the surface on the rotation direction side and the internal rotation member body 23a.

The external rotation member 24 includes: a side plate part 24a, located in a side position of the outer circumferential convex parts 23f of the internal rotation member 23 and inserted into the convex part 23c of the internal rotation member 23 in a rotation manner; a circular ring part 24b fixed to an outer circumference of the side plate part 24a through screws at the outer side of the outer circumferential convex parts 23f of the internal rotation member 23; and a cover part (not shown) inserted into the convex part 23b in a rotation manner in a state of being configured oppositely to the side plate part 24a. It should be noted that at the internal rotation member 23, the bearing balls kept at the surfaces and the backs of the outer circumferential convex parts 23f are respectively rolled and simultaneously rotated on the cover part and the side plate part 24a. Thus, the internal rotation member 23 is smoothly rotated.

In addition, the external rotation member 24 includes five inner circumferential convex parts 24d integrally formed with the circular ring part 24b in a manner of protruding to an inner circumferential side of the circular ring part 24b and configured alternately with the outer circumferential convex parts 23f of the internal rotation member 23. The side plate part 24a and the cover part are fixed to the inner circumferential convex parts 24d through screws.

Moreover, a chain ring 25 is fixedly arranged at an outer circumferential part of a back side of the circular ring part 24b of the external rotation member 24.

An electromagnet A is assembled on the outer circumferential convex parts 23f, and a permanent magnet B is assembled on the inner circumferential convex parts 24d on the rotation direction side of the advancing outer circumferential convex parts 23f.

The permanent magnet B is assembled in the inner circumferential convex parts 24d in such a manner that a magnetic pole of one side opposite to the electromagnet A is S pole.

The electromagnet A can switch the polarity of one side opposite to the permanent magnet B into N pole and S pole. The switching of the magnetic pole can be, for example, realized by changing a direction of flowing current. In addition, the switching of the magnetic pole is, for example, conducted at a time of stopping the crankshaft, and for example, a torque sensor arranged in the motor driving unit of the electric auxiliary bicycle can be configured to judge whether the crankshaft is stopped.

(Actions of Rotation Transmission Mechanism)

Figure 23:
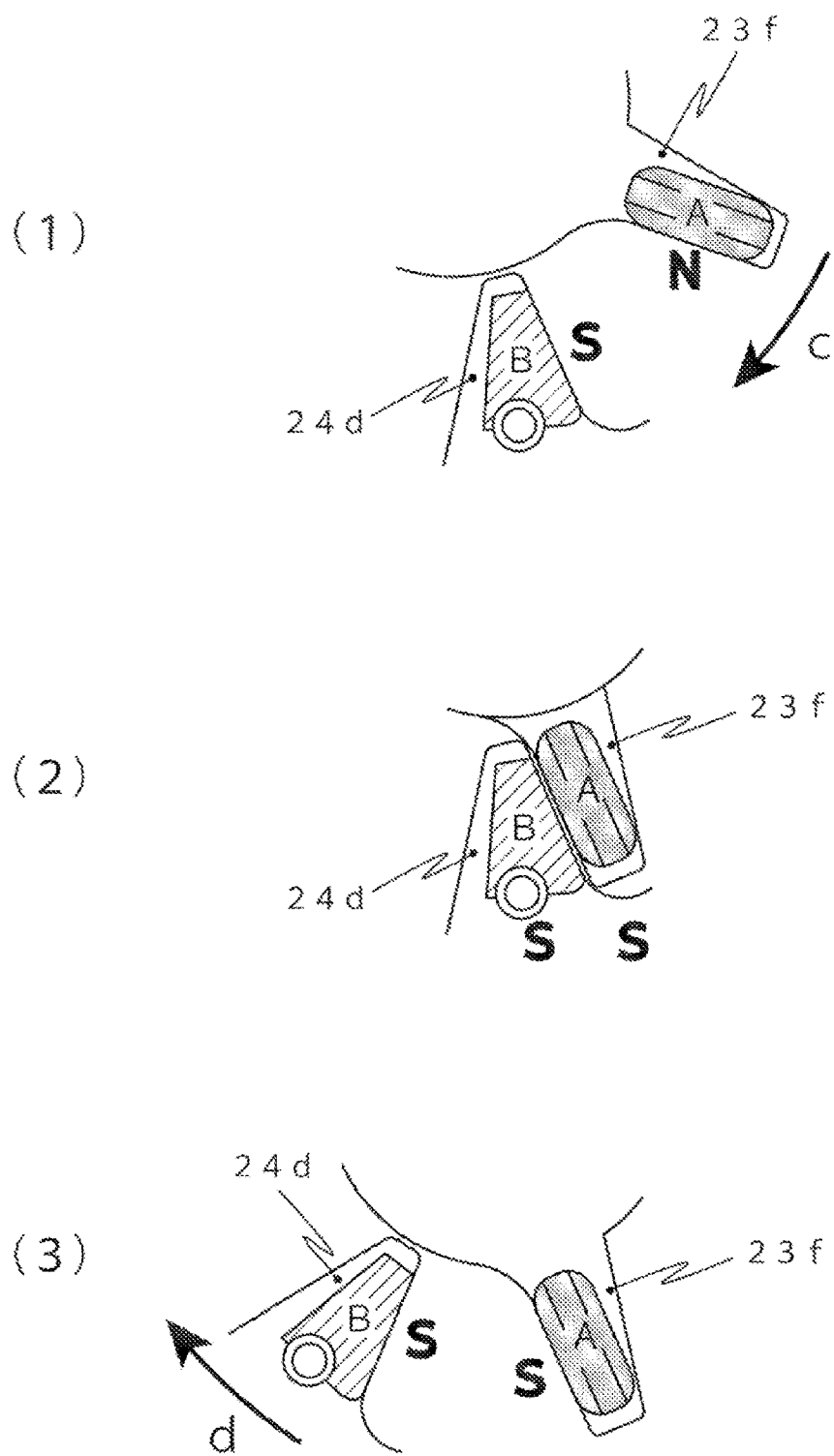
FIG. 23 is an action description diagram illustrating a rotational apparatus in embodiment IV of the present disclosure.

Next, with reference to FIG. 23, actions of the rotational apparatus 22 in the present embodiment are described. Herein, for example, a condition that the rotational apparatus 22 is assembled and connected to the crankshaft of the bicycle is taken as an example for description.

FIG. 23 is an action description diagram illustrating a rotational apparatus in embodiment IV of the present disclosure.

As shown in FIG. 22, initially, the polarity of one side, opposite to the permanent magnet B assembled in the inner circumferential convex parts 24d, of the electromagnet A assembled in the outer circumferential convex parts 23f is N pole. In this state, when a bicyclist pedals the pedals configured at the end parts of the crank arms, the outer circumferential convex parts 23f protruded on the outer circumference of the internal rotation member body 23a are rotated together with the crankshaft in a direction of an arrow c shown in FIG. 22 and FIG. 23(1). The outer circumferential convex parts 23f assembled with the electromagnet A are abutted against the inner circumferential convex parts 24d assembled with the permanent magnet B (N pole of the electromagnet A is bonded with the S pole of the permanent magnet B together). After the outer circumferential convex parts 23f are abutted against the inner circumferential convex parts 24d, the rotating force of the crankshaft is transmitted from the outer circumferential convex parts 23f to the inner circumferential convex parts 24d; approximately integral rotation is performed from the crankshaft to the chain ring 25; and a chain (not shown) arranged on the chain ring 25 is tensioned to reliably transmit rotation to a sprocket at a back wheel side.

When a bicyclist stops pedaling the pedals configured at the end parts of the crank arms, the rotation of the crankshaft is stopped and the torque sensor detects the crankshaft. Then, a signal is transmitted from the torque sensor to a current control part, and the current control part is configured to change a direction of current flowing in the electromagnet A. The polarity of one side of the electromagnet A opposite to the permanent magnet B is switched from N pole to S pole (with reference to FIG. 23(2)). As a result, as shown in FIGS. 23(2) and (3), the inner circumferential convex parts 24d assembled with the permanent magnet B are away from the outer circumferential convex parts 23f assembled with the electromagnet A (S pole of the electromagnet A and S pole of the permanent magnet B repel each other) (with reference to an arrow d in FIG. 23(3)). Thus, the external rotation member 24 rotates. The external rotation member 24 is stopped after further rotating together with the internal rotation member 23 (crankshaft) in such a state that the inner circumferential convex parts 24d are abutted against the outer circumferential convex parts 23f.

When the rotation of the crankshaft is stopped, the torque sensor detects the crankshaft. Then, a signal is transmitted from the torque sensor to a current control part, and the current control part is configured to change a direction of current flowing in the electromagnet A. The polarity of one side of the electromagnet A opposite to the permanent magnet B is switched from S pole to N pole (with reference to FIG. 23(1)). As a result, the outer circumferential convex parts 23f assembled with the electromagnet A approach the inner circumferential convex parts 24d assembled with the permanent magnet B; and the outer circumferential convex parts 23f assembled with the electromagnet A are abutted against the inner circumferential convex parts 24d assembled with the permanent magnet B (N pole of the electromagnet A is bonded with the S pole of the permanent magnet B together). At this moment, the crankshaft is stopped after temporarily rotating together with the internal rotation member 23.

When the rotation of the crankshaft is stopped, the torque sensor detects the crankshaft. Then, a signal is transmitted from the torque sensor to a current control part, and the current control part is configured to change a direction of current flowing in the electromagnet A. The polarity of one side of the electromagnet A opposite to the permanent magnet B is switched from N pole to S pole (with reference to FIG. 23(2)). As a result, as shown in FIG. 23(3), the inner circumferential convex parts 24d assembled with the permanent magnet B are away from the outer circumferential convex parts 23f assembled with the electromagnet A (S pole of the electromagnet A and S pole of the permanent magnet B repel each other) (with reference to an arrow d in FIG. 23(3)). Thus, the external rotation member 24 rotates. The external rotation member 24 is stopped after further rotating together with the internal rotation member 23 (crankshaft) in such a state that the inner circumferential convex parts 24d are abutted against the outer circumferential convex parts 23f.

The above actions are repeated; approximately integral rotation is performed from the external rotation member 24 to the chain ring 25; and a chain (not shown) arranged on the chain ring 25 is tensioned to transmit the rotation to a sprocket at a back wheel side.

It should be noted that in the present embodiment, a condition that an electromagnet A is assembled on the outer circumferential convex parts 23f and a permanent magnet B is assembled on the inner circumferential convex parts 24d on the rotation direction side of the advancing outer circumferential convex parts 23f is taken as an example for description, but is not necessarily limited to such composition. Alternatively, the permanent magnet is assembled on the outer circumferential convex parts 23f, and the electromagnet is assembled on the inner circumferential convex parts 24d on the rotation direction side of the advancing outer circumferential convex parts 23f. In addition, alternatively, electromagnets are assembled on the outer circumferential convex parts 23f and the inner circumferential convex parts 24d on the rotation direction side of the advancing outer circumferential convex parts 23f.

In addition, in the present embodiment, a condition that five outer circumferential convex parts 23f and five inner circumferential convex parts 24d are respectively arranged is taken as an example for description, but is not necessarily limited to such composition. A number of the outer circumferential convex parts 23f and a number of the inner circumferential convex parts 24d are respectively one or more.

In addition, in the present embodiment, a condition that the outer circumferential convex parts 23f and the internal rotation member body 23a are integrally formed is taken as an example for description, but is not necessarily limited to such composition. The outer circumferential convex parts can also be fixedly arranged on the internal rotation member body.

In addition, in the present embodiment, a condition that the inner circumferential convex parts 24d and the circular ring part 24b are integrally formed is taken as an example for description, but is not necessarily limited to such composition. The inner circumferential convex parts can also be fixedly arranged on the circular ring part.

Figure 24:
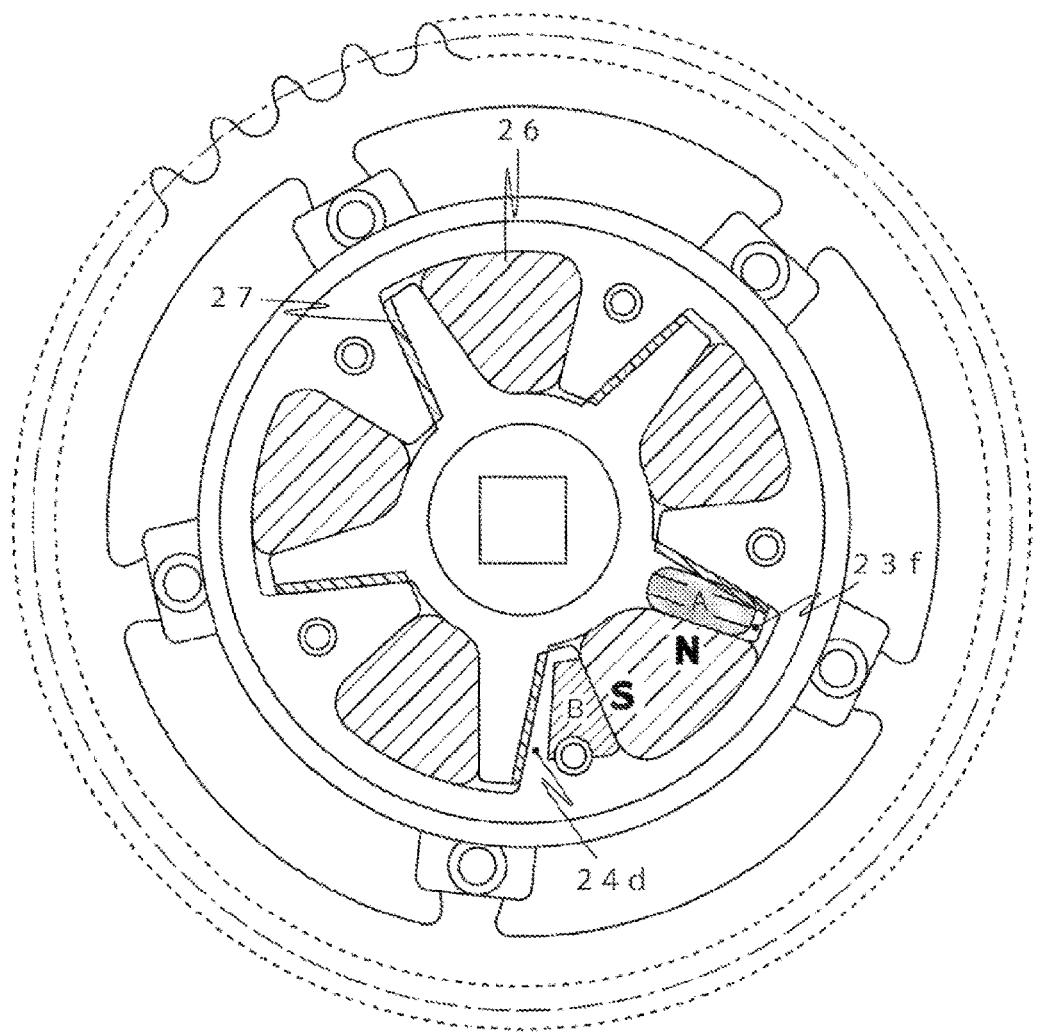
FIG. 24 is a surface diagram illustrating a state after removing a cover part in another composition of a rotational apparatus in embodiment IV of the present disclosure.

In addition, in the present embodiment, as shown in FIG. 24, it may be also like above embodiments I to IV that elastic parts 26 are configured between the outer circumferential convex parts 23f and the inner circumferential convex parts 24d on a rotation direction side of the advancing outer circumferential convex parts 23f.

Moreover, an elastic member 27 formed by the elastic body and the like can also be assembled on the surface of the outer circumferential convex parts 23f on the opposite side of the rotation direction to enable the outer circumferential convex parts 23f to have a damper effect.

LIST OF REFERENCE NUMERALS 1, 17 and 22: rotational apparatus
2 and 14: crankshaft (rotating shaft)
3, 18 and 23: internal rotation member
3a, 18a and 23a: internal rotation member body
3b, 3c, 18b, 18c, 23b and 23c: convex part
3d: press-in concave part
3'd and 18e: splined hole
3e, 18d and 23d: through hole for inserting crankshaft
3f, 18f and 23f: outer circumferential convex part
3g, 3h, 18g and 18h: bearing ball
4, 19 and 24: external rotation member
4a, 19a and 24a: side plate part
4b, 19b and 24b: circular ring part
4c, 19c and 24c: cover part
4d and 19d: inner circumferential convex part 5, 20 and 25: chain ring
6 and 21: elastic part
14a: spline
A: electromagnet

What is claimed is:

1. A rotational apparatus, comprising: an internal rotation member inserted by a rotating shaft; and an external rotation member configured on the internal rotation member in a free rotation manner, wherein:
   the internal rotation member comprises: a disc-shaped internal rotation member body having a through hole for inserting the rotating shaft; and one or more outer circumferential convex parts, integrally formed with the internal rotation member body or fixedly arranged on the internal rotation member body, and protruding to an outer circumferential side of the internal rotation member body;
   the external rotation member comprises: a circular ring part configured on the internal rotation member at an outer side of the outer circumferential convex parts of the internal rotation member in a rotation manner; and one or more inner circumferential convex parts, integrally formed with the circular ring part in a manner of protruding to an inner circumferential side of the circular ring part or fixedly arranged on the circular ring part, and configured alternately with the outer circumferential convex parts of the internal rotation member;
   elastic parts are configured between the outer circumferential convex parts and the inner circumferential convex parts on a rotation direction side of the advancing outer circumferential convex parts; and when the internal rotation member and the external rotation member rotate, the elastic parts are clamped between the outer circumferential convex parts and the inner circumferential convex parts and generate elastic deformation,
   wherein in the rotational apparatus,
   the outer circumferential convex parts are formed in such a manner that a surface on the rotation direction side is greater than a surface on an opposite side of the rotation direction; and
   the outer circumferential convex parts are formed in such a manner that the surface on the rotation direction side is inclined more gently than the surface on the opposite side of the rotation direction, and a fillet is formed on a boundary part between the surface on the rotation direction side and the internal rotation member body.

2. The rotation transmission mechanism according to claim 1, wherein
   a surface in the inner circumferential convex parts opposite to the surface on the rotation direction side of the outer circumferential convex parts is formed in a sunken state.

3. The rotational apparatus according to claim 2, wherein
   at least part of the through hole for inserting the rotating shaft is a splined hole.

4. The rotational apparatus according to claim 2, wherein
   a relative angle between the internal rotation member and the external rotation member during relative rotation is 4° to 30°.

5. The rotational apparatus according to claim 1, wherein
   at least part of the rotating shaft inserting the through hole is a splined hole.

6. The rotational apparatus according to claim 5, wherein
   a relative angle between the internal rotation member and the external rotation member during relative rotation is 4° to 30°.

7. The rotational apparatus according to claim 1, wherein
   a relative angle between the internal rotation member and the external rotation member during relative rotation is 4° to 30°.

8. A rotational apparatus, comprising: an internal rotation member inserted by a rotating shaft; and an external rotation member configured on the internal rotation member in a free rotation manner, wherein
   the internal rotation member comprises: a disc-shaped internal rotation member body having a through hole for inserting the rotating shaft; and one or more outer circumferential convex parts, integrally formed with the internal rotation member body or fixedly arranged on the internal rotation member body, and protruding to an outer circumferential side of the internal rotation member body;
   the external rotation member comprises: a circular ring part configured on the internal rotation member at an outer side of the outer circumferential convex parts of the internal rotation member in a rotation manner; and one or more inner circumferential convex parts, integrally formed with the circular ring part in a manner of protruding to an inner circumferential side of the circular ring part or fixedly arranged on the circular ring part, and configured alternately with the outer circumferential convex parts of the internal rotation member,
   wherein in the rotational apparatus,
   a polarity-switchable electromagnet is assembled on any one of the outer circumferential convex parts and the inner circumferential convex parts on the rotation direction side of the advancing outer circumferential convex parts; and a permanent magnet or electromagnet is assembled on the other one.

9. The rotational apparatus according to claim 8, wherein
   a relative angle between the internal rotation member and the external rotation member during relative rotation is 4° to 30°.

10. A bicycle, comprising the rotational apparatus comprising: an internal rotation member inserted by a rotating shaft; and an external rotation member configured on the internal rotation member in a free rotation manner, wherein:
   the internal rotation member comprises: a disc-shaped internal rotation member body having a through hole for inserting the rotating shaft; and one or more outer circumferential convex parts, integrally formed with the internal rotation member body or fixedly arranged on the internal rotation member body, and protruding to an outer circumferential side of the internal rotation member body;
   the external rotation member comprises: a circular ring part configured on the internal rotation member at an outer side of the outer circumferential convex parts of the internal rotation member in a rotation manner; and one or more inner circumferential convex parts, integrally formed with the circular ring part in a manner of protruding to an inner circumferential side of the circular ring part or fixedly arranged on the circular ring part, and configured alternately with the outer circumferential convex parts of the internal rotation member;
   elastic parts are configured between the outer circumferential convex parts and the inner circumferential convex parts on a rotation direction side of the advancing outer circumferential convex parts; and when the internal rotation member and the external rotation member rotate, the elastic parts are clamped between the outer circumferential convex parts and the inner circumferential convex parts and generate elastic deformation, wherein in the rotational apparatus,
the outer circumferential convex parts are formed in such a manner that a surface on the rotation direction side is greater than a surface on an opposite side of the rotation direction; and
the outer circumferential convex parts are formed in such a manner that the surface on the rotation direction side is inclined more gently than the surface on the opposite side of the rotation direction, and a fillet is formed on a boundary part between the surface on the rotation direction side and the internal rotation member body.

11. The bicycle according to claim 10, wherein
a surface in the inner circumferential convex parts opposite to the surface on the rotation direction side of the outer circumferential convex parts is formed in a sunken state.

12. The bicycle according to claim 10, wherein
at least part of the through hole for inserting the rotating shaft is a splined hole.

13. A bicycle, comprising a rotational apparatus, comprising: an internal rotation member inserted by a rotating shaft; and an external rotation member configured on the internal rotation member in a free rotation manner, wherein
the internal rotation member comprises: a disc-shaped internal rotation member body having rotating shaft inserting a through hole; and one or more outer circumferential convex parts, integrally formed with the internal rotation member body or fixedly arranged on the internal rotation member body, and protruding to an outer circumferential side of the internal rotation member body;
the external rotation member comprises: a circular ring part configured on the internal rotation member at an outer side of the outer circumferential convex parts of the internal rotation member in a rotation manner; and one or more inner circumferential convex parts, integrally formed with the circular ring part in a manner of protruding to an inner circumferential side of the circular ring part or fixedly arranged on the circular ring part, and configured alternately with the outer circumferential convex parts of the internal rotation member,
wherein in the rotational apparatus,
a polarity-switchable electromagnet is assembled on any one of the outer circumferential convex parts and the inner circumferential convex parts on the rotation direction side of the advancing outer circumferential convex parts; and a permanent magnet or electromagnet is assembled on the other one.

14. The bicycle according to claim 13, wherein
a relative angle between the internal rotation member and the external rotation member during relative rotation is 4° to 30°.

* * * * *